(12) United States Patent
Lin et al.

(10) Patent No.: US 11,700,648 B2
(45) Date of Patent: Jul. 11, 2023

(54) NETWORK DEVICE, TERMINAL DEVICE, AND METHODS THEREIN

(71) Applicant: Telefonaktiebolaget LM Ericsson (publ), Stockholm (SE)

(72) Inventors: Zhipeng Lin, Nanjing (CN); Jingya Li, Gothenburg (SE); Robert Mark Harrison, Grapevine, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 66 days.

(21) Appl. No.: 15/733,021

(22) PCT Filed: Mar. 24, 2020

(86) PCT No.: PCT/EP2020/058228
§ 371 (c)(1),
(2) Date: Apr. 9, 2020

(87) PCT Pub. No.: WO2020/216552
PCT Pub. Date: Oct. 29, 2020

(65) Prior Publication Data
US 2021/0378025 A1 Dec. 2, 2021

(30) Foreign Application Priority Data

Apr. 26, 2019 (WO) ................ PCT/CN2019/084446

(51) Int. Cl.
*H04W 74/08* (2009.01)
*H04W 72/0446* (2023.01)
(Continued)

(52) U.S. Cl.
CPC ....... *H04W 74/0841* (2013.01); *H04L 5/0023* (2013.01); *H04L 5/0048* (2013.01);
(Continued)

(58) Field of Classification Search
CPC ........... H04W 74/0841; H04W 74/004; H04W 74/0866; H04W 74/0833; H04W 72/0446;
(Continued)

(56) References Cited

U.S. PATENT DOCUMENTS

2014/0112254 A1* 4/2014 Lindoff ............. H04W 74/0833
370/328
2017/0006637 A1* 1/2017 Sahlin ................... H04L 5/0007
(Continued)

FOREIGN PATENT DOCUMENTS

CN 108886811 A 11/2018
CN 109392181 A 2/2019
(Continued)

OTHER PUBLICATIONS

"New work item: 2-step RACH for NR," 3GPP TSG RAN Meeting #82, RP-182894, Sorrento, Italy, Dec. 10-13, 2018, ZTE Corporation, Sanechips.
(Continued)

*Primary Examiner* — Redentor Pasia
(74) *Attorney, Agent, or Firm* — Nicholson De Vos Webster & Elliott LLP

(57) ABSTRACT

A method of transmitting a Random Access Channel (RACH) Occasion configuration to a terminal device and receiving a RACH preamble according to the RACH Occasion configuration. The RACH Occasion configuration comprises a first time resource indication identifying a first set of time resources in which the terminal device is allowed to transmit a RACH preamble according to a first random access procedure, a first frequency resource indication identifying at least a first set of frequency resources in which the terminal device is allowed to transmit the RACH preamble, a second time resource indication identifying a second set of time resources in which the terminal device is allowed to
(Continued)

transmit a RACH preamble according to a second random access procedure, and a second frequency resource indication identifying at least a second set of frequency resources in which the terminal device is allowed to transmit the RACH preamble.

29 Claims, 13 Drawing Sheets

(51) Int. Cl.
*H04W 72/0453* (2023.01)
*H04W 74/00* (2009.01)
*H04L 5/00* (2006.01)
*H04W 72/23* (2023.01)

(52) U.S. Cl.
CPC ... *H04W 72/0446* (2013.01); *H04W 72/0453* (2013.01); *H04W 72/23* (2023.01); *H04W 74/004* (2013.01); *H04W 74/0833* (2013.01); *H04W 74/0866* (2013.01); *H04L 5/0064* (2013.01); *H04L 5/0091* (2013.01)

(58) Field of Classification Search
CPC ............. H04W 72/0453; H04L 5/0023; H04L 5/0064; H04L 5/0048; H04L 5/0091
See application file for complete search history.

(56) References Cited

U.S. PATENT DOCUMENTS

| | | | |
|---|---|---|---|
| 2017/0231011 A1* | 8/2017 | Park | H04W 72/0446 |
| 2018/0092129 A1 | 3/2018 | Guo et al. | |
| 2018/0097591 A1 | 4/2018 | Islam et al. | |
| 2018/0167979 A1* | 6/2018 | Guo | H04W 74/0833 |
| 2019/0053271 A1* | 2/2019 | Islam | H04W 74/0866 |
| 2019/0150110 A1* | 5/2019 | Ko | H04J 11/0069 370/350 |
| 2019/0150190 A1* | 5/2019 | Kim | H04W 56/0015 370/329 |
| 2019/0159203 A1* | 5/2019 | Kim | H04W 48/10 |
| 2019/0223223 A1* | 7/2019 | Ko | H04L 5/0053 |
| 2019/0223228 A1* | 7/2019 | Ko | H04W 72/0446 |
| 2019/0254064 A1* | 8/2019 | Islam | H04W 74/004 |
| 2019/0268947 A1 | 8/2019 | Zhang et al. | |
| 2019/0327766 A1* | 10/2019 | Zhang | H04L 27/261 |
| 2019/0364599 A1* | 11/2019 | Islam | H04L 5/0048 |
| 2020/0037297 A1* | 1/2020 | Pan | H04W 72/044 |
| 2020/0112996 A1* | 4/2020 | Pan | H04W 74/00 |
| 2020/0305202 A1* | 9/2020 | Zhang | H04W 72/04 |
| 2020/0314917 A1* | 10/2020 | Jeon | H04W 74/08 |
| 2020/0344815 A1* | 10/2020 | Svedman | H04W 56/001 |
| 2021/0136814 A1* | 5/2021 | You | H04W 74/006 |
| 2022/0030636 A1 | 1/2022 | Ren et al. | |

FOREIGN PATENT DOCUMENTS

| | | |
|---|---|---|
| CN | 109495222 A | 3/2019 |
| EP | 3471497 A1 | 4/2019 |
| WO | 2019/024130 A1 | 2/2019 |

OTHER PUBLICATIONS

3GPP TS 38.211 V15.5.0, "3rd Generation Partnership Project; Technical Specification Group Radio Access Network; NR; Physical channels and modulation (Release 15)," Mar. 2019, 96 pages, 3GPP Organizational Partners.
3GPP TS 38.213 V15.5.0, "3rd Generation Partnership Project; Technical Specification Group Radio Access Network; NR; Physical layer procedures for control (Release 15)," Mar. 2019, 104 pages, 3GPP Organizational Partners.
Communication under Rule 71(3), EP App. No. 20714464.3, dated May 20, 2021, 192 pages.
International Preliminary Report on Patentability, PCT App. No. PCT/EP2020/058228, dated Feb. 26, 2021, 21 pages.
International Search Report and Written Opinion, PCT App. No. PCT/EP2020/058228, dated Jun. 3, 2020, 10 pages.
NTT DOCOMO, Inc., "Discussion on remaining details on RACH procedure," Sep. 18-21, 2017, 7 pages, 3GPP TSG RAN WG1 Meeting NR#3, R1-1716074, Nagoya, Japan.
Office Action, CN App. No. 202111589216.2, dated Jun. 29, 2022, 5 pages of Original Document Only.
Office Action, EP App. No. 20714464.3, dated Sep. 30, 2021, 2 pages.
Extended European Search Report, EP Application No. 21204724.5, dated May 3, 2022, 9 pages.
Notification to Grant Patent Right for Invention, CN App. No. 202111589216.2, dated Nov. 9, 2022, 4 pages (2 pages of English Translation and 2 pages of Original Document).
Office Action, CO App. No. NC2021/0013818, dated Oct. 10, 2022, 24 pages (13 pages of English Translation and 11 pages of Original Document).
Office Action, CO App. No. NC2021/0013818, dated Apr. 11, 2023, 28 pages (15 pages of English Translation and 13 pages of Original Document).

* cited by examiner

Example:
- #SSBs-per-PRACH-occasion = 4
- #CB-preambles-per-SSB = 4

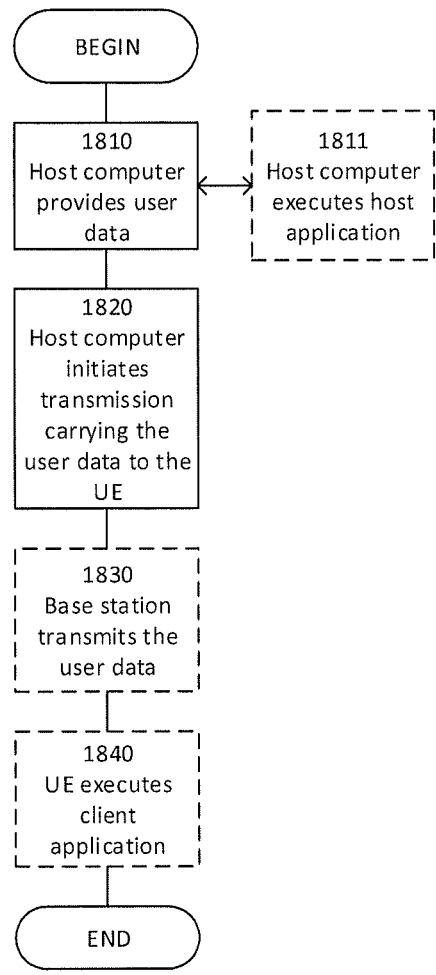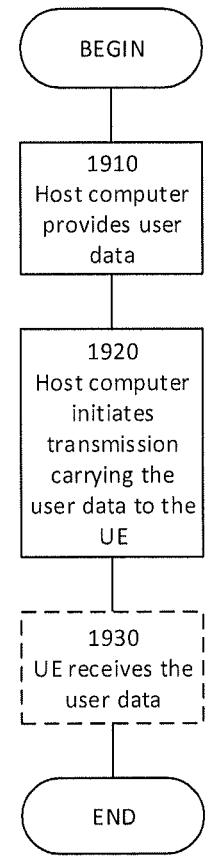
FIG. 18
FIG. 19

NETWORK DEVICE, TERMINAL DEVICE, AND METHODS THEREIN

CROSS-REFERENCE TO RELATED APPLICATIONS

This application is a National stage of International Application No. PCT/EP2020/058228, filed Mar. 24, 2020, which claims priority to International Application No. PCT/CN2019/084446, filed Apr. 26, 2019, which are hereby incorporated by reference.

TECHNICAL FIELD

The present disclosure relates to wireless communication, and more particularly, to a network device, a terminal device and methods therein.

BACKGROUND

Random access is performed by a terminal device, e.g., User Equipment (UE), in New Radio (NR) and Long Term Evolution (LTE) networks for accessing to a new cell. Once a random access procedure is completed, a terminal device can be connected to a network device, e.g., evolved NodeB (eNB) or gNB, and communicate with the network device using dedicated transmissions.

A four-step random access procedure has been defined for NR. FIG. 1A shows a signaling sequence of a four-step random access procedure. As shown, at 101, a UE detects a Synchronization Signal (SS) from a gNB. At 102, the UE decodes Master Information Block (MIB) and System Information Block (SIB) (i.e., Remaining Minimum System Information (RMSI) and Other System Information (OSI), which may be distributed over multiple physical channels such as Physical Broadcast Channel (PBCH) and Physical Downlink Shared Channel (PDSCH), to acquire random access transmission parameters. At 111, where the UE transmits a Physical Random Access Channel (PRACH) preamble, or Message 1, to the gNB. The gNB detects the Message 1 and responds with a Random Access Response (RAR), or Message 2, at 112. At 113, the UE transmits a Physical Uplink Shared Channel (PUSCH), or Message 3, to the gNB in accordance with configuration information for PUSCH transmission carried in the RAR. At 114, the gNB transmits a Contention Resolution Message, or Message 4, to the UE.

In the four-step random access procedure as shown in FIG. 1A, the resource, including time resource and frequency resource, for PUSCH (i.e., Message 3) is indicated in the RAR (i.e., Message 2). In particular, the RAR contains an uplink grant including a 14-bit "PUSCH frequency resource allocation" field indicating the frequency domain resource for PUSCH and a 4-bit "PUSCH time resource allocation" field indicating the time domain resource for PUSCH.

In order to minimize the number of channel accesses, which is important for e.g. operations in unlicensed frequency bands where Listen Before Talk (LBT) is required before transmission, a two-step random access procedure has also been proposed for NR. Instead of using the four steps 111~114, the two-step random access procedure completes random access in only two steps with two messages, which may be referred to as Message A and Message B. FIG. 1B shows a signaling sequence of a two-step random access procedure. As shown, the steps 101~102 in FIG. 1B are the same as the steps 101~102 in FIG. 1A. At 121, the UE transmits a PRACH preamble and a PUSCH in one message (i.e., Message A, msgA) to the gNB. The PUSCH may include higher layer data such as Radio Resource Control (RRC) connection request, possibly with some small additional payload. At 122, the gNB transmits Message B (msgB) to the UE, including UE identifier assignment, timing advance information and CRM, etc.

SUMMARY

It is an object of the present disclosure to provide a network device, a terminal device and methods therein, capable of determining time-frequency resources for RACH Occasions for two-step and four-step random access procedures.

According to a first aspect of the present disclosure, a method in a network device is provided. The method may include: transmitting a Random Access Channel (RACH) Occasion configuration to a terminal device, and receiving a RACH preamble which is transmitted from the terminal device according to the RACH Occasion configuration. The RACH Occasion configuration may comprise a first time resource indication identifying at least a first set of time resources in which the terminal device is allowed to transmit a RACH preamble according to a first random access procedure, a first frequency resource indication identifying at least a first set of frequency resources in which the terminal device is allowed to transmit the RACH preamble according to the first random access procedure, a second time resource indication identifying at least a second set of time resources in which the terminal device is allowed to transmit a RACH preamble according to a second random access procedure, and a second frequency resource indication identifying at least a second set of frequency resources in which the terminal device is allowed to transmit the RACH preamble according to the second random access procedure.

In an embodiment, the second set of time resources are at least partly different from the first set of time resources in time domain and/or the second set of frequency resources are at least partly different from the first set of frequency resources in frequency domain.

In an embodiment, the first and second time resource indications are configured so that the second time resource indication identifies a part in a RACH configuration table, and the first time resource indication identifies a different part in the RACH configuration table.

In an embodiment, the part may comprise rows and/or columns in the RACH configuration table.

In an embodiment, an existing RACH configuration table configured for the first random access procedure is reused or modified as the RACH configuration table.

In an embodiment, the first time resource indication is in a form of a first RACH configuration table, and the second time resource indication is in a form of a second RACH configuration table different from the first RACH configuration table.

In an embodiment, the second frequency resource indication may comprise a parameter defining a number of RACH occasions that are frequency division multiplexed in at least one time resource, and/or a parameter defining an offset of a lowest RACH occasion relative to an index of a Physical Resource Block (PRB).

In an embodiment, the PRB is a first PRB in a bandwidth part containing the second set of frequency resources, or a PRB in the first set of frequency resources.

In an embodiment, the PRB in the first set of frequency resources is a PRB whose index is the lowest or largest in the first set of frequency resources.

In an embodiment, the parameter defining a number of RACH occasions that are frequency division multiplexed in at least one time resource is configured by taking at least one of the following parameters into accounts: a number of RACH occasions that are frequency division multiplexed in the at least one time resource for the first random access procedure, a preamble format for the second random access procedure, a frequency band for the second random access procedure and a RACH time configuration for the second random access procedure.

In an embodiment, the method may further comprise determining whether the received RACH preamble is associated with the first random access procedure or the second random access procedure.

In an embodiment, the method may further comprise transmitting a Random Access Response (RAR) to the terminal device in response to determining that the received RACH preamble is associated with the first random access procedure.

In an embodiment, the method may further comprise transmitting a Random Access Response (RAR) to the terminal device in response to receiving a RACH preamble without receiving PUSCH data, wherein the RACH preamble is associated with the second random access procedure.

In an embodiment, the second time resource indication and the second frequency resource indication are configured by taking at least one of the following parameters into accounts: a periodicity for the second random access procedure relative to the periodicity for the first random access procedure; a possible collision between the second random access procedure and the first random access procedure; and a possible collision between the second random access procedure with other signals than a RACH preamble.

In an embodiment, the second time resource indication and the second frequency resource indication may indicate that the second set of time resources is a subset of the first set of time resources in time domain and the second set of frequency resources is a subset of the first set of frequency resources in frequency domain.

In an embodiment, the second time resource indication and the second frequency resource indication may further indicate an association period.

In an embodiment, the association period is configured by taking the following parameters for the second random access procedure into account: a preamble format, a RACH configuration period, an association period configuration, and an association pattern period configuration.

In an embodiment, the second time resource indication and the second frequency resource indication are transmitted via an RRC message.

In an embodiment, the subset of time resources or frequency resources is configured by taking the following parameters for the second random access procedure into account: a number of RACH occasions mapped by a whole set of Synchronization Signal (SS)/Physical Broadcast Channel (PBCH) blocks (SSBs) in one SSB burst set; a number of SSBs actually transmitted; a RACH configuration index, and whether the spectrum type is paired spectrum or unpaired spectrum.

In an embodiment, the time resources are subframes if the RACH preamble is transmitted in a first frequency range, or the time resources are slots if the RACH preamble is transmitted in a second frequency range.

In an embodiment, the first random access procedure is a four-step random access procedure, and the second random access procedure is a two-step random access procedure. In the two-step random access procedure, the terminal device transmits message A including RACH preamble and PUSCH data.

According to a second aspect of the present disclosure, a network device is provided. The terminal device may include a transceiver, a processor and a memory. The memory contains instructions executable by the processor whereby the network device is operative to perform the method according to the above first aspect.

According to a third aspect of the present disclosure, a computer readable storage medium is provided. The computer readable storage medium has computer program instructions stored thereon. The computer program instructions, when executed by a processor in a network device, cause the network device to perform the method according to the above first aspect.

According to a fourth aspect of the present disclosure, a method in a terminal device is provided. The method may include: receiving a Random Access Channel (RACH) Occasion configuration from a network device, and transmitting a RACH preamble according to the RACH Occasion configuration. The RACH Occasion configuration may comprise a first time resource indication identifying at least a first set of time resources in which the terminal device is allowed to transmit a RACH preamble according to a first random access procedure, a first frequency resource indication identifying at least a first set of frequency resources in which the terminal device is allowed to transmit the RACH preamble according to the first random access procedure, a second time resource indication identifying at least a second set of time resources in which the terminal device is allowed to transmit a RACH preamble according to a second random access procedure, and a second frequency resource indication identifying at least a second set of frequency resources in which the terminal device is allowed to transmit the RACH preamble according to the second random access procedure.

In an embodiment, the second set of time resources are at least partly different from the first set of time resources in time domain and/or the second set of frequency resources are at least partly different from the first set of frequency resources in frequency domain.

In an embodiment, the first and second time resource indications are configured so that the second time resource indication identifies a part in a RACH configuration table, and the first time resource indication identifies a different part in the RACH configuration table.

In an embodiment, the part comprises rows and/or columns in the RACH configuration table.

In an embodiment, an existing RACH configuration table configured for the first random access procedure is reused or modified as the RACH configuration table.

In an embodiment, the transmitting a RACH preamble according to the RACH Occasion configuration may comprise: determining a lowest RACH occasion in the second set of frequency resources by adding one or more to an index of a PRB whose index is the largest in the first set of frequency resources.

In an embodiment, the second frequency resource indication may comprise a parameter defining an offset of a lowest RACH occasion relative to a PRB, and the transmitting a RACH preamble according to the RACH Occasion configuration may comprise: determining the lowest RACH occasion in the second set of frequency resources by at least one of:

adding the offset to an index of a first PRB in a bandwidth part containing the second set of frequency resources, adding the offset to an index of a PRB whose index is the lowest in the first set of frequency resources in case that the PRB is the first PRB in the bandwidth part containing the second set of frequency resources, and adding the offset to an index of a PRB whose index is the largest in the first set of frequency resources.

In an embodiment, the second frequency resource indication comprises a parameter defining a number of RACH occasions that are frequency division multiplexed in at least one time resource.

In an embodiment, the parameter defining a number of RACH occasions that are frequency division multiplexed in at least one time resource is configured by taking at least one of the following parameters into accounts: a number of RACH occasions that are frequency division multiplexed in at least one time resource for the first random access procedure, a preamble format for the second random access procedure, a frequency band for the second random access procedure, and a RACH time configuration for the second random access procedure.

In an embodiment, the second time resource indication and the second frequency resource indication indicates that the second set of time resources is a subset of the first set of time resources in time domain and the second set of frequency resources is a subset of the first set of frequency resources in frequency domain.

In an embodiment, the method may further comprise in response to determining a time-frequency resource within the second set of time resources and the second set of frequency resources to be used for transmitting a RACH preamble according to the second random access procedure is within the first set of time resources and within the first set of frequency resources, transmitting a RACH preamble in the time-frequency resource according to the first random access procedure.

In an embodiment, the second time resource indication and the second frequency resource indication further indicates an association period.

In an embodiment, the association period is configured by taking the following parameters for the second random access procedure into account: a preamble format, a RACH configuration period, an association period configuration, and an association pattern period configuration.

In an embodiment, the second time resource indication and the second frequency resource indication are received via an RRC message.

In an embodiment, the subset of time resources or frequency resources is configured by taking the following parameters for the second random access procedure into account: a number of RACH occasions mapped by a whole set of Synchronization Signal (SS)/Physical Broadcast Channel (PBCH) blocks (SSBs) in one SSB burst set; a number of SSBs actually transmitted; a RACH configuration index, and whether the spectrum type is paired spectrum or unpaired spectrum.

In an embodiment, the method may further comprise: receiving, from the network device, a Random Access Response (RAR) including an indication that identifies resources in which the terminal device is allowed to transmit PUSCH data, wherein the network device determines that the RACH preamble is associated with the first random access procedure; and transmitting the PUSCH data in the identified resources.

In an embodiment, if the RACH preamble is to be transmitted according to the second random access procedure, the method may further comprise: transmitting PUSCH data in a predetermined set of resources in message A.

In an embodiment, the method may further comprise: determining whether an upcoming time resource is in the first set of time resource or the second set of time resource; and transmitting a RACH preamble according to the first random access procedure if the upcoming time resource is in the first set of time resource and according to the second random access procedure if the upcoming time resource is in the second set of time resource.

In an embodiment, the method may further comprise: receiving a Random Access Response (RAR) from the network device after a RACH preamble and PUSCH data are transmitted according to the second random access procedure or only a RACH preamble is transmitted according to the second access procedure, wherein the network device determines that the RACH preamble is associated with the second random access procedure but no PUSCH data being received or correctly decoded.

In an embodiment, the second time resource indication and the second frequency resource indication are configured by taking at least one of the following parameters into accounts: a periodicity for the second random access procedure relative to the periodicity for the first random access procedure; a possible collision between the second random access procedure and the first random access procedure; and a possible collision between the second random access procedure with other signals than a RACH preamble.

In an embodiment, the time resources are subframes if the RACH preamble is transmitted in a first frequency range or the time resources are slots if the RACH preamble is transmitted in a second frequency range.

In an embodiment, the first random access procedure is a four-step random access procedure, and the second random access procedure is a two-step random access procedure. In the two-step random access procedure, the terminal device transmits message A including RACH preamble and PUSCH data According to a fifth aspect of the present disclosure, a terminal device is provided. The terminal device may include a transceiver, a processor and a memory. The memory contains instructions executable by the processor whereby the terminal device is operative to perform the method according to the above fourth aspect.

According to a sixth aspect of the present disclosure, a computer readable storage medium is provided. The computer readable storage medium has computer program instructions stored thereon. The computer program instructions, when executed by a processor in a terminal device, cause the terminal device to perform the method according to the above fourth aspect.

With the embodiments of the present disclosure, the time-frequency resources for RACH Occasions in the two-step random access procedure are configured with respect to the time-frequency resources for RACH Occasions in the two-step random access procedure, so that they are shared or separated.

BRIEF DESCRIPTION OF THE DRAWINGS

The above and other objects, features and advantages will be more apparent from the following description of embodiments with reference to the figures, in which:

FIGS. 18 to 21 are flowcharts illustrating methods implemented in a communication system including a host computer, a base station and a user equipment.

DETAILED DESCRIPTION

Figure 1A:
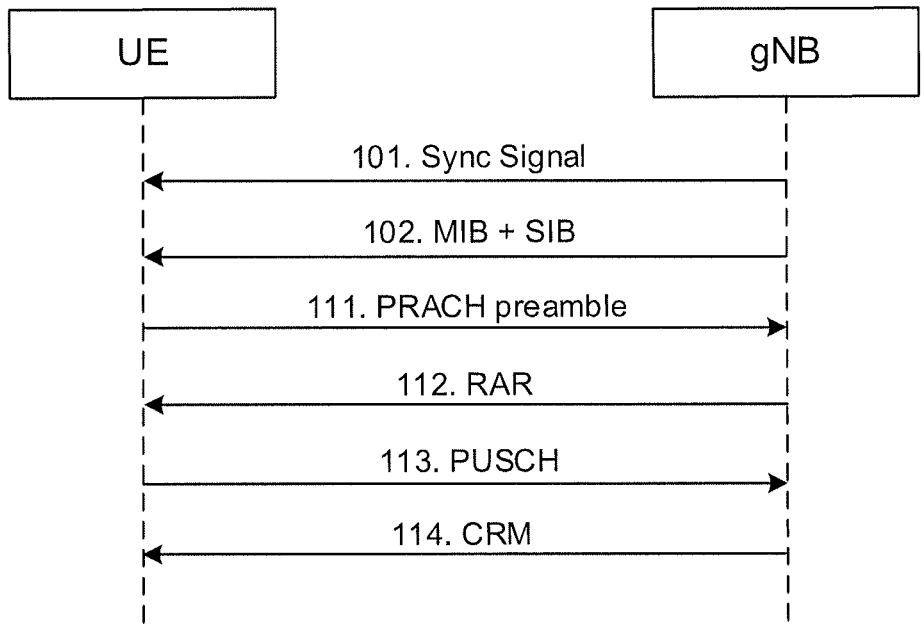
FIG. 1A is a sequence diagram showing a four-step random access procedure.
Figure 1B:
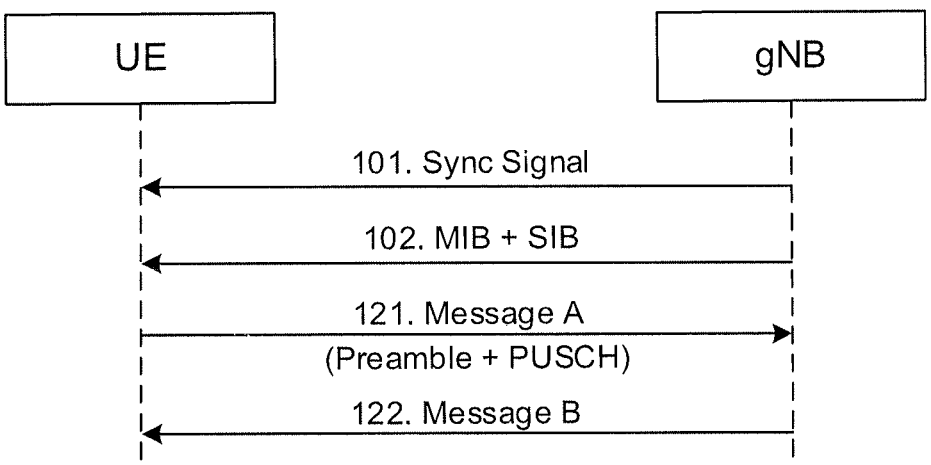
FIG. 1B is a sequence diagram showing a two-step random access procedure.

As used herein, the term "wireless communication network" refers to a network following any suitable communication standards, such as NR, LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, Global System for Mobile Communications (GSM), Universal Mobile Telecommunications System (UMTS), Long Term Evolution (LTE), and/or other suitable 1G (the first generation), 2G (the second generation), 2.5G, 2.75G, 3G (the third generation), 4G (the fourth generation), 4.5G, 5G (the fifth generation) communication protocols, wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

The term "network node" or "network device" refers to a device in a wireless communication network via which a terminal device accesses the network and receives services therefrom. The network node or network device refers to a base station (BS), an access point (AP), or any other suitable device in the wireless communication network. The BS may be, for example, a node B (NodeB or NB), an evolved NodeB (eNodeB or eNB), or gNB, a Remote Radio Unit (RRU), a radio header (RH), a remote radio head (RRH), a relay, a low power node such as a femto, a pico, and so forth. Yet further examples of the network device may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, portable computers, desktop computers, image capture terminal devices such as digital cameras, gaming terminal devices, music storage and playback appliances, a mobile phone, a cellular phone, a smart phone, voice over IP (VoIP) phones, wireless local loop phones, tablets, personal digital assistants (PDAs), wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

The terminal device may support device-to-device (D2D) communication, for example by implementing a 3GPP standard for sidelink communication, and may in this case be referred to as a D2D communication device.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink transmission refers to a transmission from a network device to a terminal device, and an uplink transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

In NR, the time and frequency resource on which a RACH preamble is transmitted is defined as a RACH Occasion.

The time resources and the preamble format for a RACH preamble is configured by a RACH configuration index. For details of the RACH configuration index, reference can be made to the $3^{rd}$ Generation Partnership Project (3GPP) Technical Specification (TS) 38.211, which is incorporated herein by reference in its entirety. The RACH configuration index indicates a row in a RACH configuration table which is specified in TS 38.211, such as Tables 6.3.3.2-2, 6.3.3.2-3, 6.3.3.2-4 for FR1 (for example, 450 MHz-6 GHz) paired spectrum, FR1 unpaired spectrum and FR2 (for example, 24.25 GHz-52.6 GHz) with unpaired spectrum, respectively, A row in a RACH configuration table specifies the time-domain RACH occasion pattern for one RACH configuration period. One RACH configuration period may be 10, 20, 40, 80, or 160 ms.

Part of the Table 6.3.3.2-3 for FR1 unpaired spectrum for the RACH preamble format 0 is copied in Table 1 below, where the value of x indicates the RACH configuration period in number of system frames. The value of y indicates the system frame within each RACH configuration period on which the RACH occasions are configured. For instance, if y is set to 0, it means RACH occasions only configured in the first frame of each RACH configuration period. The values in the column "subframe number" define which subframes are configured with RACH occasions. The values in the column "starting symbol" are symbol indexes. Determination of time resources for RACH occasions for FR2 using table 6.3.3.2-4 is similar, except that 60 kHz slots are used instead of subframes.

In case of Time Division Duplex (TDD), semi-statically configured downlink parts and/or actually transmitted SSBs can override and invalidate some time-domain RACH occasions defined in the RACH configuration table. More specifically, RACH occasions in the uplink part are always valid, and a RACH occasion within the downlink part is valid as long as it does not precede or collide with an SSB in the RACH slot and it is at least N symbols after the downlink part and the last symbol of an SSB. N is 0 or 2 depending on the RACH format and the subcarrier spacing.

TABLE 1

RACH configuration for preamble format 0 for FR1 unpaired spectrum

| RACH Configuration Index | Preamble format | $n_{SFN}$ mod x = y | | Subframe number | Starting symbol | Number of PRACH slots within a subframe | $N_t^{RA,slot}$, number of time-domain PRACH occasions within a PRACH slot | $N_{dur}^{RA}$, RACH duration |
|---|---|---|---|---|---|---|---|---|
| | | x | y | | | | | |
| 0 | 0 | 16 | 1 | 9 | 0 | — | — | 0 |
| 1 | 0 | 8 | 1 | 9 | 0 | — | — | 0 |
| 2 | 0 | 4 | 1 | 9 | 0 | — | — | 0 |
| 3 | 0 | 2 | 0 | 9 | 0 | — | — | 0 |
| 4 | 0 | 2 | 1 | 9 | 0 | — | — | 0 |

TABLE 1-continued

RACH configuration for preamble format 0 for FR1 unpaired spectrum

| RACH Configuration Index | Preamble format | $n_{SFN}$ mod x = y | | Subframe number | Starting symbol | Number of PRACH slots within a subframe | $N_t^{RA,slot}$, number of time-domain PRACH occasions within a PRACH slot | $N_{dur}^{RA}$, RACH duration |
|---|---|---|---|---|---|---|---|---|
| | | x | y | | | | | |
| 5  | 0 | 2  | 0 | 4          | 0 | — | — | 0 |
| 6  | 0 | 2  | 1 | 4          | 0 | — | — | 0 |
| 7  | 0 | 1  | 0 | 9          | 0 | — | — | 0 |
| 8  | 0 | 1  | 0 | 8          | 0 | — | — | 0 |
| 9  | 0 | 1  | 0 | 7          | 0 | — | — | 0 |
| 10 | 0 | 1  | 0 | 6          | 0 | — | — | 0 |
| 11 | 0 | 1  | 0 | 5          | 0 | — | — | 0 |
| 12 | 0 | 1  | 0 | 4          | 0 | — | — | 0 |
| 13 | 0 | 1  | 0 | 3          | 0 | — | — | 0 |
| 14 | 0 | 1  | 0 | 2          | 0 | — | — | 0 |
| 15 | 0 | 1  | 0 | 1, 6       | 0 | — | — | 0 |
| 16 | 0 | 1  | 0 | 1, 6       | 7 | — | — | 0 |
| 17 | 0 | 1  | 0 | 4, 9       | 0 | — | — | 0 |
| 18 | 0 | 1  | 0 | 3, 8       | 0 | — | — | 0 |
| 19 | 0 | 1  | 0 | 2, 7       | 0 | — | — | 0 |
| 20 | 0 | 1  | 0 | 8, 9       | 0 | — | — | 0 |
| 21 | 0 | 1  | 0 | 4, 8, 9    | 0 | — | — | 0 |
| 22 | 0 | 1  | 0 | 3, 4, 9    | 0 | — | — | 0 |
| 23 | 0 | 1  | 0 | 7, 8, 9    | 0 | — | — | 0 |
| 24 | 0 | 1  | 0 | 3, 4, 8, 9 | 0 | — | — | 0 |
| 25 | 0 | 1  | 0 | 6, 7, 8, 9 | 0 | — | — | 0 |
| 26 | 0 | 1  | 0 | 1, 4, 6, 9 | 0 | — | — | 0 |
| 27 | 0 | 16 | 0 | 1, 3, 5, 7, 9 | 0 | — | — | 0 |

In the frequency domain, NR supports multiple frequency-multiplexed RACH occasions on the same time-domain RACH occasion. This is mainly motivated by the support of analog beam sweeping in NR such that the RACH occasions associated to one SSB are configured at the same time instance but different frequency locations. RACH preambles can only be transmitted in the frequency resources given by the higher-layer parameter msg1-FrequencyStart. The frequency resource for RACH occasions $n_{RA} \in \{0, 1, \ldots, M-1\}$, where M equals the higher-layer parameter msg1-FDM, is numbered in increasing order within the initial active uplink bandwidth part during initial access, starting from the lowest frequency. Otherwise, $n_{RA}$ is numbered in increasing order within the active uplink bandwidth part, starting from the lowest frequency. The number M of RACH occasions that are frequency division multiplexed (FDMed) in one time-domain RACH occasion, can be 1, 2, 4, or 8.

Here the msg1-FDM and msg1-FrequencyStart are defined in "RACH-ConfigGenetic" information element in 3GPP TS 38.211 as below:
  msg1-FDM
  The number of RACH occasions frequency division multiplexed in one time instance. (see TS 38.211, clause 6.3.3.2)
    msg1-FrequencyStart
    Offset of a lowest RACH transmission occasion in frequency domain with respective to PRB 0. The value is configured so that the corresponding RACH resource is entirely within the bandwidth of the uplink Bandwidth Part (BWP). (see TS 38.211, clause 6.3.3.2).

| RACH-ConfigGeneric information element | |
|---|---|
| prach-ConfigurationIndex | INTEGER (0..255), |
|   msg1-FDM | ENUMERATED {one, two, four, eight}, |
|   msg1-FrequencyStart | INTEGER (0..maxNrofPhysicalResourceBlocks−1), |
|   zeroCorrelationZoneConfig | INTEGER(0..15), |
|   preambleReceivedTargetPower | INTEGER (−202..−60), |
|   preambleTransMax | ENUMERATED {n3, n4, n5, n6, n7, n8, n10, n20, n10, n100, n200}, |
|   powerRampingStep | ENUMERATED {dB0, dB2, dB4, dB6}, |
|   ra-ResponseWindow | ENUMERATED {sl1, sl2, al4, al8, sl10, sl20, sl40, sl80}, |
|   ... | |
| } | |
| -- TAG-RACH-CONFIG-GENERIC-STOP | |
| -- ASN1STOP | |

Figure 2:
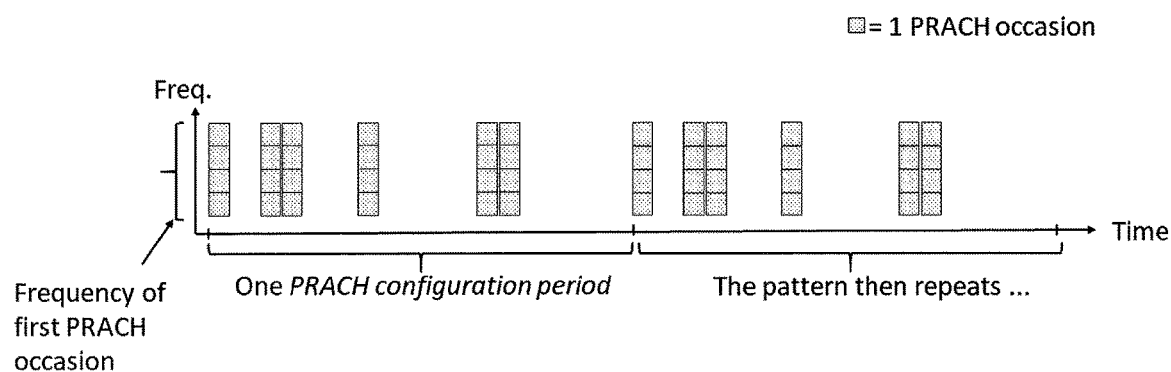
FIG. 2 illustrates an example of the RACH Occasion configuration in NR.

FIG. 2 illustrates an example of the RACH Occasion configuration in NR. As shown in FIG. 2, four RACH occasions are frequency division multiplexed in one time instance.

In NR Rel-15, there are up to 64 sequences that can be used as RACH preambles per RACH occasion in each cell. The RRC parameter totalNumberOfRA-Preambles determines how many of these 64 sequences are used as RACH preambles per RACH occasion in each cell. The 64 sequences are configured by including firstly all the available cyclic shifts of a root Zadoff-Chu sequence, and secondly in the order of increasing root index, until 64 preambles have been generated for the RACH occasion.

Figure 3:
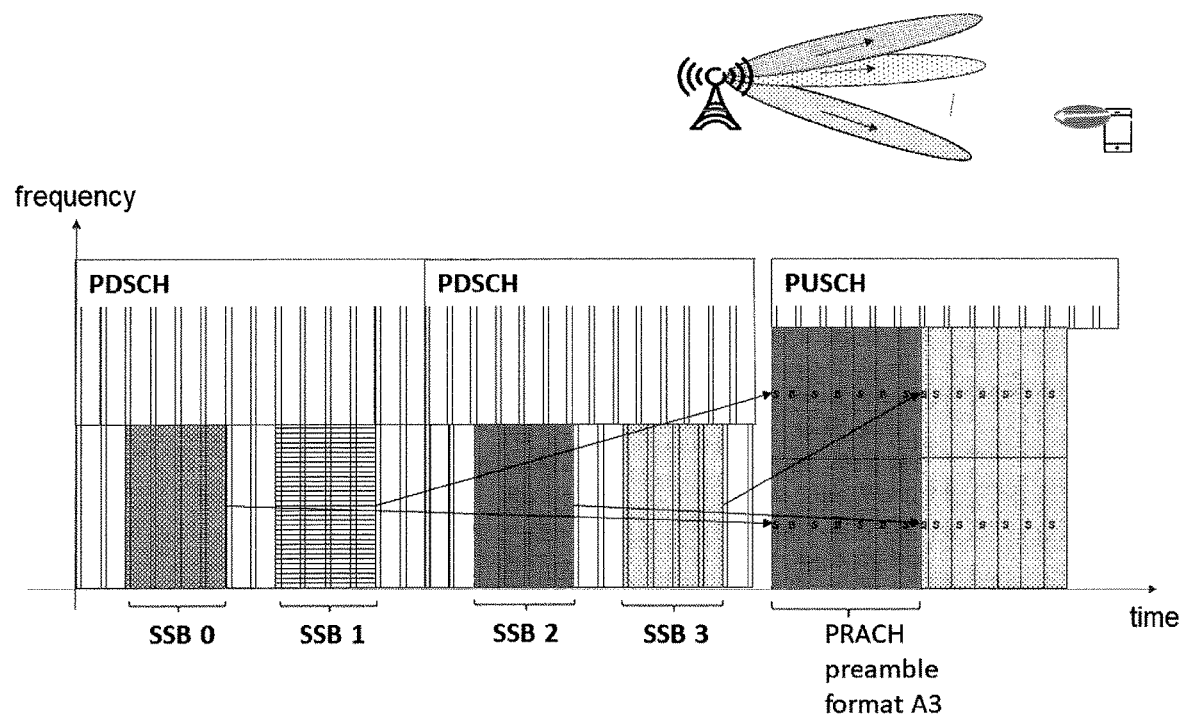
FIG. 3 illustrates an example where there is one SSB per RACH occasion.
Figure 4:
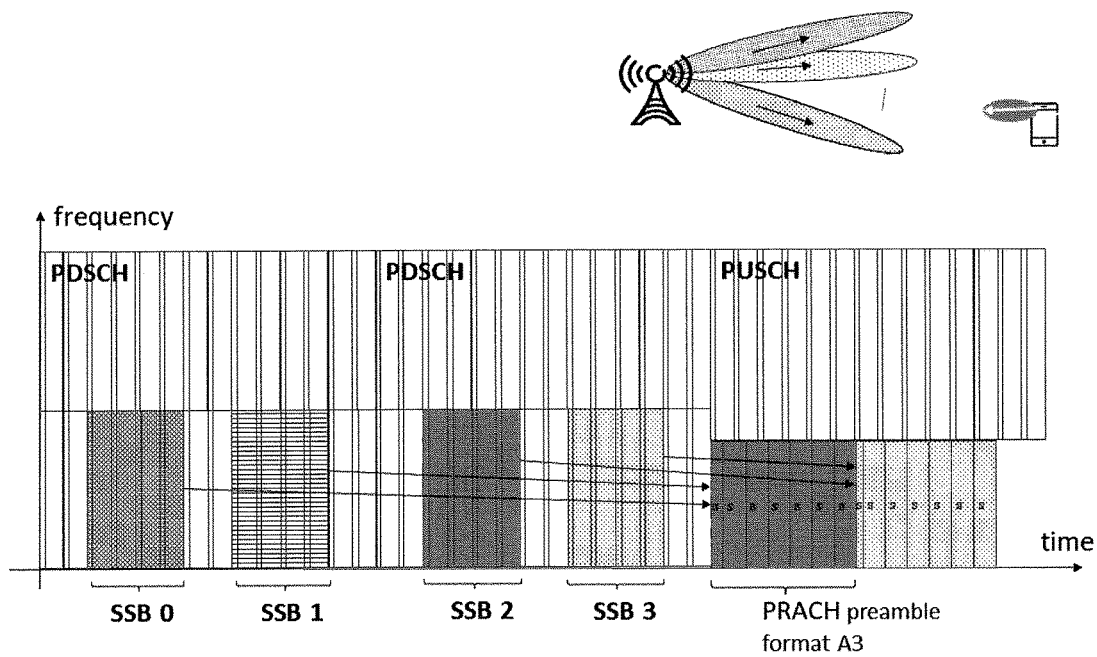
FIG. 4 illustrates an example where there are 2 SSBs per RACH occasion.

NR Rel-15 supports one-to-one, one-to-many, and many-to-one association between SSB and RACH Occasions, as illustrated in FIG. 3 and FIG. 4, where FIG. 3 illustrates an example where there is one SSB per RACH occasion, and FIG. 4 illustrates an example where there are 2 SSBs per RACH occasion.

The RACH preambles associated to each SSB is configured by two RRC parameters in RACH-ConfigCommon:
ssb-perRACH-OccasionAndCB-PreamblesPerSSB and totalNumberOfRA-Preambles.

The detailed mapping rule is specified in TS 38.213 section 8.1 (which is incorporated herein by reference in its entirety), as following:

A UE is provided a number N of SS/PBCH blocks associated with one PRACH occasion and a number R of contention-based preambles per SS/PBCH block per valid PRACH occasion by ssb-perRACH-OccasionAndCB-PreamblesPerSSB. If N<1, one SS/PBCH block is mapped to 1/N consecutive valid PRACH occasions and R contention based preambles with consecutive indexes associated with the SS/PBCH block per valid PRACH occasion start from preamble index 0. If N≥1, R contention based preambles with consecutive indexes associated with SS/PBCH block n, on 0≤n≤N−1, per valid PRACH occasion start from preamble index $n \cdot N_{preamble}^{total}/N$ where $N_{preamble}^{total}$ is provided by totalNumberOfRA-Preambles and is an integer multiple of N.

SS/PBCH block indexes provided by ssb-PositionsInBurst in SIB1 or in ServingCellConfigCommon are mapped to valid PRACH occasions in the following order.
  First, in increasing order of preamble indexes within a single PRACH occasion
  Second, in increasing order of frequency resource indexes for frequency multiplexed PRACH occasions
  Third, in increasing order of time resource indexes for time multiplexed PRACH occasions within a PRACH slot
  Fourth, in increasing order of indexes for PRACH slots An association period, starting from frame 0, for mapping SS/PBCH blocks to PRACH occasions is the smallest value in the set determined by the PRACH configuration period according Table 8.1-1 such that $N_{Tx}^{SSB}$ SS/PBCH blocks are mapped at least once to the PRACH occasions within the association period, where a UE obtains $N_{Tx}^{SSB}$ from the value of ssb-PositionsInBurst in SIB1 or in ServingCellConfigCommon. If after an integer number of SS/PBCH blocks to PRACH occasions mapping cycles within the association period there is a set of PRACH occasions that are not mapped to $N_{Tx}^{SSB}$ SS/PBCH blocks, no SS/PBCH blocks are mapped to the set of PRACH occasions. An association pattern period includes one or more association periods and is determined so that a pattern between PRACH occasions and SS/PBCH blocks repeats at most every 160 msec. PRACH occasions not associated with SS/PBCH blocks after an integer number of association periods, if any, are not used for PRACH transmissions.

Figure 5:
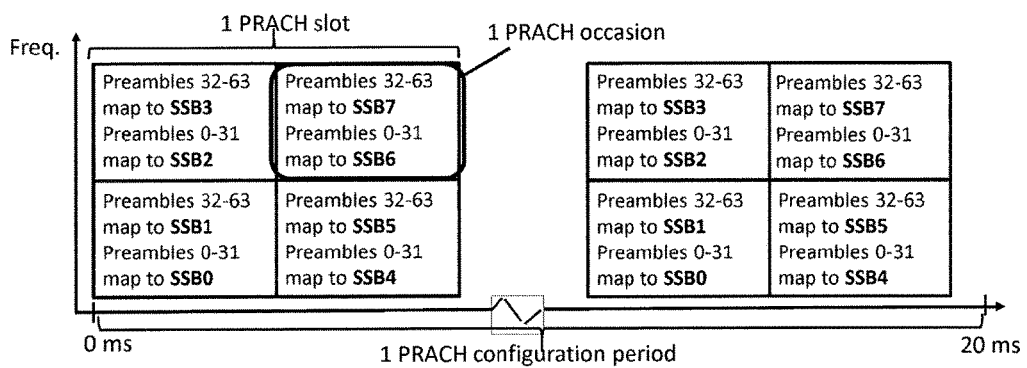
FIG. 5 illustrates an example of the mapping between SSB and RACH preambles.

In other words, the mapping between SSB and preambles in done by consecutively associating M preambles to each SSB, where $M=N_{preamble}^{total}/N$, and the preambles are taken in the following order
  First, in increasing order of preamble indexes within a single PRACH occasion.
  Second, in increasing order of frequency resource indexes for frequency multiplexed PRACH occasions.
  Third, in increasing order of time FIG. 5 illustrates an example of the mapping between SSB and RACH preambles, where the number of SSBs is 8, M=32 (i.e., 2 SSB per RACH occasions), the number of RACH occasions that are frequency division multiplexed in one time instance is 2. The RACH format is A3, i.e., 2 TD RACH occasions per slot. The RACH configuration period is 20 ms, and there are 2 RACH slots per configuration period.

Figure 6:
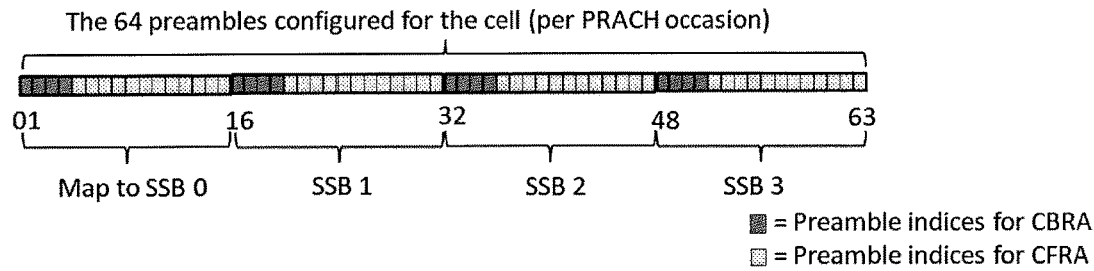
FIG. 6 illustrates an example of the associated preambles for CBRA and CFRA per SSB per RACH occasion.

For each SSB, the associated preambles per RACH occasion are further divided into two sets for Contention Based Random Access (CBRA) and Contention Free Random Access (CFRA). The number of CBRA preambles per SSB per RACH occasion is signaled by the RRC parameter #CB-preambles-per-SSB. Preamble indices for CBRA preambles and CFRA preambles are mapped consecutively for one SSB in one RACH occasion. FIG. 6 illustrates an example of the associated preambles for CBRA and CFRA per SSB per RACH occasion.

For two-step random access work item in NR release 16, latest agreements from in 3GPP RAN1 #96b meeting regarding how to define the RACH Occasions (ROs) and the PUSCH occasions for two-step random access are made as below.
  Agreements:
  For the relation of PRACH resources between two-step and four-step RACH procedures, the network has the flexibility to configure the following options:
    Option 1: Separate ROs are configured for two-step and four-step RACH
    Option 2: Shared RO but separate preambles for two-step and four-step RACH
  Agreements:
  One or more PUSCH occasion(s) within an msgA PUSCH configuration period are configured.
    FFS msgA PUSCH configuration period, e.g.
      For opt. 1 with separate PUSCH configuration, msgA PUSCH configuration period may or may not be the same as PRACH configuration period
      For opt. 2 PUSCH configuration with relative location, msgA PUSCH configuration period is the PRACH configuration period It can be seen from the above agreement that in one option of PRACH configuration, preambles to be used for two-step and four-step RACH procedures are in separate ROs and therefore separate OFDM symbols and/or separate sets of subcarriers, while in another option preambles to be used for two-step and four-step RACH procedures can be in one RO and therefore in the same set of OFDM symbols and subcarriers.

It can also be seen from the above agreement that PUSCH occasions carrying msgA data part occur in resources that are preconfigured in two-step RACH procedure, which is in contrast to msg3 transmission, which occurs in resources that are scheduled by the RAR in four-step RACH procedure.

Hereinafter, the description is described by taking the four-step random access procedure as a first random access procedure and the two-step random access procedure as a second random access procedure.

Hereinafter, the "RACH preamble" refers to a PRACH preamble used for four-step random access procedure, or a msgA preamble used for two-step random access procedure.

Figure 7:
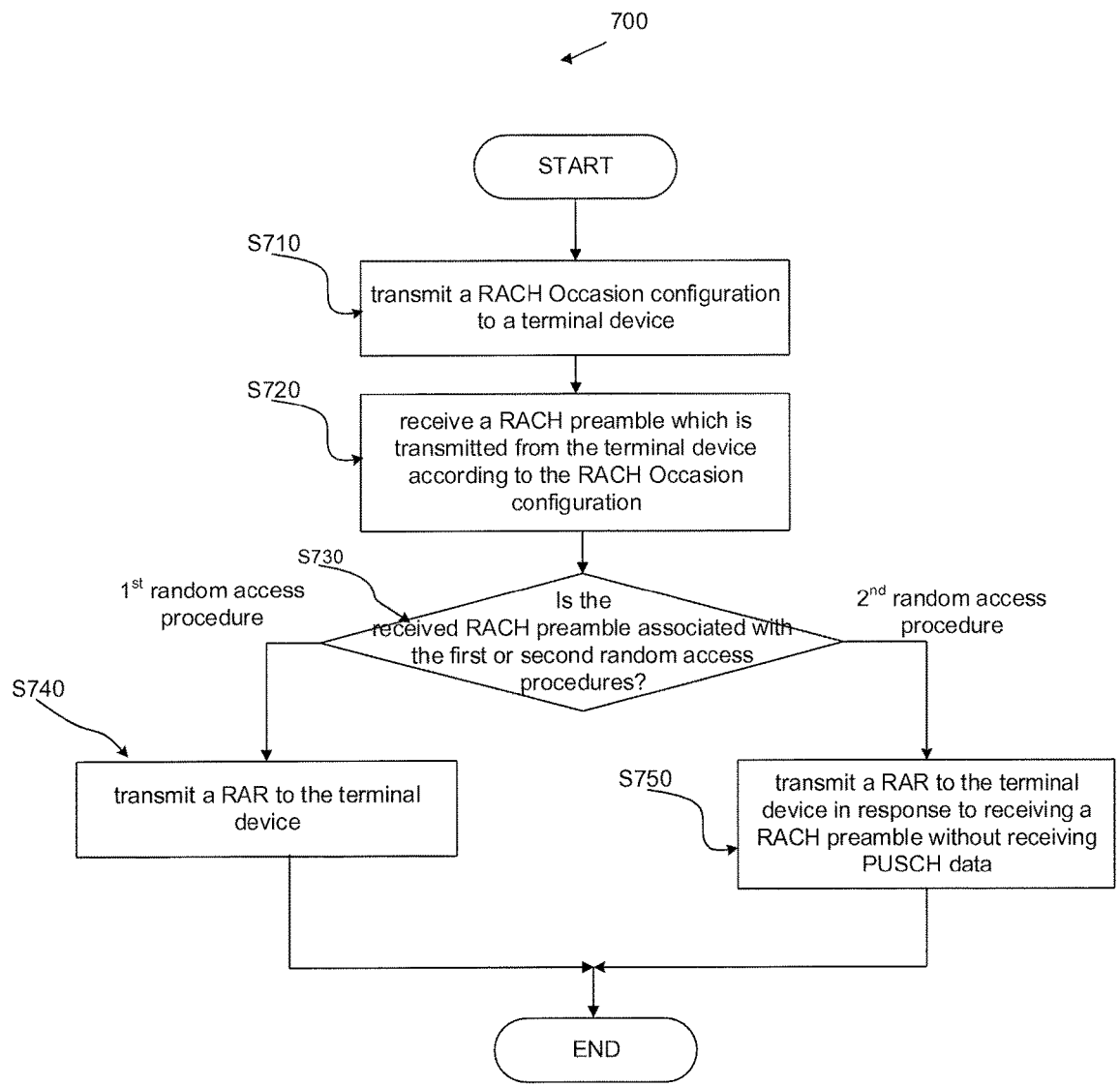
FIG. 7 is a flowchart illustrating a method in a network device according to an embodiment of the present disclosure.

FIG. 7 is a flowchart illustrating a method 700 according to an embodiment of the present disclosure. The method 700 can be performed at a network device, e.g., a gNB.

At step S710, the network device transmits a Random Access Channel (RACH) Occasion configuration to a terminal device. The RACH Occasion configuration comprises a first time resource indication identifying at least a first set of time resources in which the terminal device is allowed to transmit a RACH preamble according to a first random access procedure, a first frequency resource indication identifying at least a first set of frequency resources in which the terminal device is allowed to transmit the RACH preamble according to the first random access procedure, a second time resource indication identifying at least a second set of time resources in which the terminal device is allowed to transmit a RACH preamble according to a second random access procedure, and a second frequency resource indication identifying at least a second set of frequency resources in which the terminal device is allowed to transmit the RACH preamble according to the second random access procedure.

Here, a random access occasion, or particularly RACH Occasion (RO), refers to the time-frequency resource for transmission of the RACH preamble.

At step S720, the network device receives a RACH preamble which is transmitted from the terminal device according to the RACH Occasion configuration.

In an embodiment, the second set of time resources are at least partly different from the first set of time resources in time domain and/or the second set of frequency resources are at least partly different from the first set of frequency resources in frequency domain. That is, the time resources and/or frequency resources for transmitting a RACH preamble according to the two-step random access procedure are configured separately from those for four-step random access procedure.

In an embodiment, the first time resource indication is in a form of a first RACH configuration table, and the second time resource indication is in a form of a second RACH configuration table different from the first RACH configuration table.

In an example, a set of tables (referred to as table set B) is used for the time resource determination for two-step random access procedure, similar to the 3 tables defined in TS 38.211, Tables 6.3.3.2-2, 6.3.3.2-3, 6.3.3.2-4 (referred to as table set A) applied for four-step random access procedure.

In an embodiment, the first and second time resource indications are configured so that the second time resource indication identifies a part in a RACH configuration table and the first time resource indication identifies a different part in the RACH configuration table. That is, Table set A and Table set B are the same, but different rows are configured for the two-step and four-step random access procedures.

In an embodiment, Table set B can be combined within the table set A to form a modified table, and different rows and/or columns in the modifies table are configured for the two-step and four-step random access procedures, respectively. That is, a new RACH configuration table is preconfigured, and the first and second time resource indications may be configured to identify different columns, or different rows in the new RACH configuration.

Figure 8:
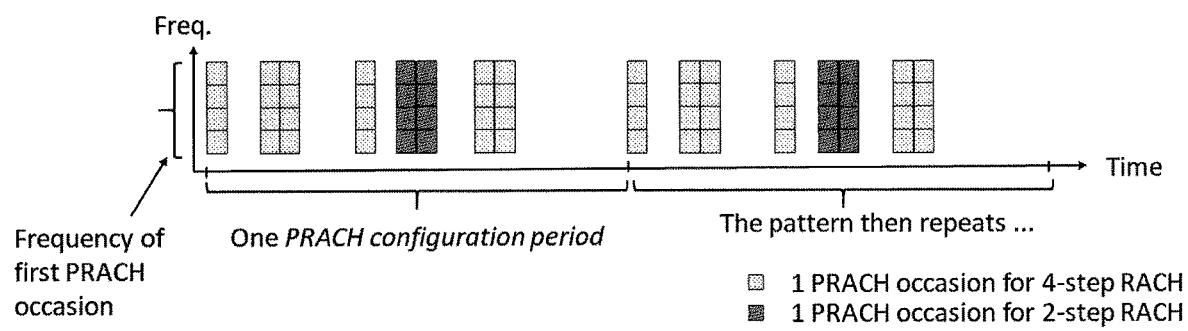
FIG. 8 illustrates an example where the time resources for the two-step random access procedure are different from those for the four-step random access procedure.

As an example, Table set A, i.e., the existing RACH configuration table configured for the four-step random access procedure, is reused for Table set B. A separate RACH configuration index is configured for two-step RACH procedure, which indicates a different row in the associated RACH configuration table as compared to the one for four-step random access procedure, so that the OFDM symbols occupied by valid RACH occasions for two-step random access are all different from the OFDM symbols occupied by valid four-step RACH occasions. FIG. 8 illustrates an example where the time resources for the two-step random access procedure are different from those for the four-step random access procedure.

A benefit of using different OFDM symbols and/or different subcarriers for the two-step and four-step RACH procedures is that incorrect operation by Rel-15 UEs that are not capable of two-step RACH operation can be avoided. If a Rel-15 UE transmits a preamble in a symbol and subcarrier that can be used for two-step operation, it will not transmit a PUSCH containing msgA, even though the network would attempt to receive the PUSCH, since Rel-16 UEs capable of two-step operation would transmit the PUSCH when transmitting the preamble in the symbol.

In an example, the frequency resources are separately configured.

In an embodiment, the second frequency resource indication comprises a parameter defining a number of RACH occasions that are frequency division multiplexed in at least one time resource. For example, a parameter "msgA_preamble-FDM" can be configured in "RACH-ConfigGeneric information element". In another embodiment, the parameter defining a number of RACH occasions that are frequency division multiplexed in at least one time resource is configured by taking at least one of the following parameters into accounts: a number of RACH occasions that are frequency division multiplexed in at least one time resource for the first random access procedure, a preamble format for the second random access procedure, a frequency band for the second random access procedure and a RACH time configuration for the second random access procedure.

In an embodiment, the second frequency resource indication comprises a parameter defining an offset of a lowest RACH occasion relative to an index of a PRB. In an example, the PRB is a first PRB in a bandwidth part containing the second set of frequency resources, or a PRB in the first set of frequency resources. The PRB in the first set of frequency resources is a PRB whose index may be the lowest or largest in the first set of frequency resources. The UE, upon receiving the parameter included in the second frequency resource indication, may determine the lowest RACH occasion in the second set of frequency resources by at least one of: adding the offset to an index of a first PRB in a bandwidth part containing the second set of frequency resources, adding the offset to an index of a PRB whose index is the lowest in the first set of frequency resources, and adding the offset to an index of a PRB whose index is the largest in the first set of frequency resources.

For example, a parameter "msgA_preamble-FrequencyStart" can be configured in "RACH-ConfigGeneric information element". As another example, an offset value FrequencyStartOffset is configured in "RACH-ConfigGeneric information element". The FrequencyStartOffset can be added to the start frequency of 1st RO for the four-step random access procedure in one time instance msg1-FrequencyStart to determine a start frequency of the 1st RO for the two-step random access procedure in one time instance msgA_preamble-FrequencyStart: i.e.

$$msgA\_preamble\text{-}FrequencyStart = msg1\text{-}FrequencyStart + FrequencyStartOffset$$

where the FrequencyStartOffset can be either a fixed value or a predetermined value or RRC configured. The whole frequency band of the ROs for the four-step procedure in one time instance depends on the number of ROs frequency division multiplexed in on time instance and the preamble format.

Figure 9:
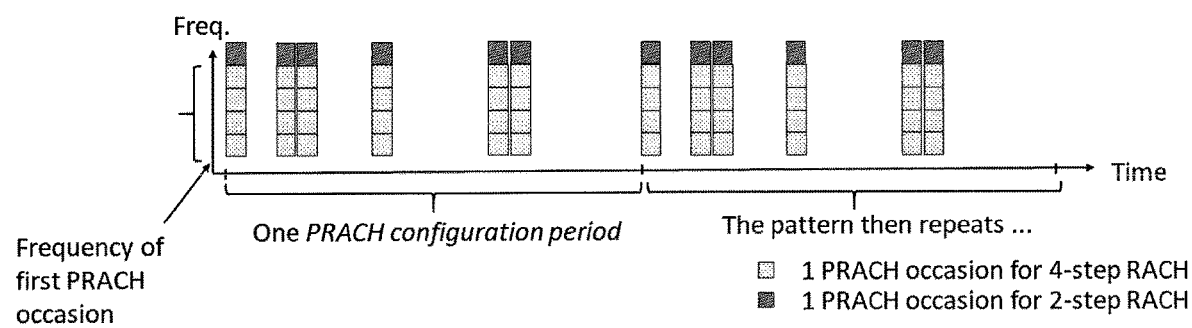
FIG. 9 illustrates an example where the frequency resources for the two-step random access procedure are different from those for the four-step random access procedure.

FIG. 9 illustrates an example wherein the second frequency resource indication comprises a parameter "msgA_preamble-FDM"=1 and no parameter defining an offset of a lowest RACH occasion relative to an index of a PRB. The RO for the two-step random access procedure starts after the last RO for the four-step random access procedure.

In an embodiment, the method 700 may further comprise a step S730 of determining whether the received RACH preamble is associated with the first random access procedure or the second random access procedure; and a step S740 of transmitting a Random Access Response (RAR) to the terminal device in response to determining that the received RACH preamble is associated with the first random access procedure. That is, if the terminal device (e.g., UE) transmits a RACH preamble according to the four-step random access procedure, the network device (e.g., gNB) should follow the four-step random access procedure to transmit a RAR to the terminal device after receiving the RACH preamble.

In an embodiment, the method 700 may further comprise a step S750 of transmitting a Random Access Response (RAR) to the terminal device in response to receiving a RACH preamble without receiving PUSCH data, wherein the RACH preamble is associated with the second random access procedure. That is, even if the terminal device (e.g., UE) transmits a RACH preamble according to the two-step random access procedure, the network device (e.g., gNB) may correctly decode the RACH preamble and know that the RACH preamble is transmitted according to the two-step random access procedure, but receive no PUSCH data or cannot decode the PUSCH data, it transmits a Random Access Response (RAR) to the terminal device by following the two-step random access procedure.

When the two-step RACH Occasions (ROs) are separately configured, the second time resource indication and the second frequency resource indication are configured by the network device taking at least one of the following parameters into accounts: a periodicity for the second random access procedure relative to the periodicity for the first random access procedure; a possible collision between the second random access procedure and the first random access procedure; and a possible collision between the second random access procedure with other signals than a RACH preamble.

For example, a periodicity for two-step random access procedure larger than that used for four-step random access procedure can be configured when only a small number of terminal devices are expected to use two-step random access procedure, while a periodicity smaller than that used for four-step random access procedure can be configured when a large number of terminal devices are expected to use two-step random access procedure.

As another example, when a two-step RO overlaps partially or completely with a four-step RO, a predetermined rule can be defined, where the rule can be that only four-step random access procedure is allowed on the four-step ROs when this overlapping happens, two-step random access procedure will be blocked. That is, the terminal device (e.g., UE) determines whether a time-frequency resource within the second set of time resources and the second set of frequency resources to be used for transmitting a RACH preamble according to the two-step random access procedure is within the first set of time resources and within the first set of frequency resources; and it transmits a RACH preamble in the time-frequency resource according to the four-step random access procedure in response to determining that a time-frequency resource within the second set of time resources and the second set of frequency resources to be used for transmitting a RACH preamble according to the two-step random access procedure is within the first set of time resources and within the first set of frequency resources.

As described above, Rel-15 NR RACH configurations identify RACH occasions according to the subframe and frequency resources in which they are transmitted. A large number (e.g., 256) of configurations are defined and that vary according to whether they are used in FR1, FR2, paired, or unpaired spectrum. In order to minimize design complexity, it may be desirable to reuse the set of configurations defined for Rel-15 for the purpose of two-step RACH in Rel-16. It is likely that a UE capable of two-step random access procedure will need to transmit according to four-step as well as two-step random access procedure. Since different Rel-15 RACH configurations can use the same subframes, two RACH configurations used for two-step and four-step random access procedures could conflict, indicating that a RACH occasion should carry preambles for both two-step and four-step operation. Excluding such combinations of RACH configurations entirely could significantly reduce the scheduling flexibility of combinations of two-step and four-step random access procedures in a cell, and therefore may be undesirable. Consequently, a mechanism may be needed to resolve conflict between two-step and four-step RACH configurations. Resources designated for use in four-step random access procedure should not be used for two-step operation, since this would be inconsistent with UEs using the resources for four-step random access procedure. Therefore, if two-step and four-step RACH configurations conflict, the UE will use a resource designated for both two-step and four-step random access procedures for four-step random access procedure.

In an embodiment, the time resources are subframes if the RACH preamble is transmitted in a first frequency range (for example, frequencies below 6 GHz), or the time resources are slots (for example, 60 kHz slots) if the RACH preamble is transmitted in a second frequency range (for example, frequencies above 6 GHz).

This method can be beneficial in terms of lower latency when analog beam sweeping is used for SSB and msg B transmission, since both two-step random access procedure capable UEs and four-step random access procedure capable UEs that are associated to the same best SSB are able to transmit preambles at the same time.

In another embodiment, the second time resource indication and the second frequency resource indication may indicate that the second set of time resources is a subset of the first set of time resources in time domain and the second set of frequency resources is a subset of the first set of frequency resources in frequency domain.

That is, the four-step ROs are shared by the two-step ROs, and a set of the ROs from four-step RA are shared.

In an embodiment, the second time resource indication and the second frequency resource indication further indicate an association period, and the association period may be configured by the network device taking the following parameters for the second random access procedure into account: a preamble format, a RACH configuration period, an association period configuration, and an association pattern period configuration. For example, only one set of the ROs in some association period for mapping SSBs to RACH occasions for four-step random access procedure are used for two-step random access procedure.

In an embodiment, the second time resource indication and the second frequency resource indication are transmitted via an RRC message.

The subset may be a fixed subset of the RO from the four-step random access procedure, or indicated via a RRC signaling. In an embodiment, the network device may configure the subset of time resources or frequency resources by taking the following parameters for the second random access procedure into account: a number of RACH occasions mapped by a whole set of SSBs in one SSB burst set; a number of SSBs actually transmitted; a RACH configuration index, and whether the spectrum type is paired spectrum or unpaired spectrum.

Figure 10:
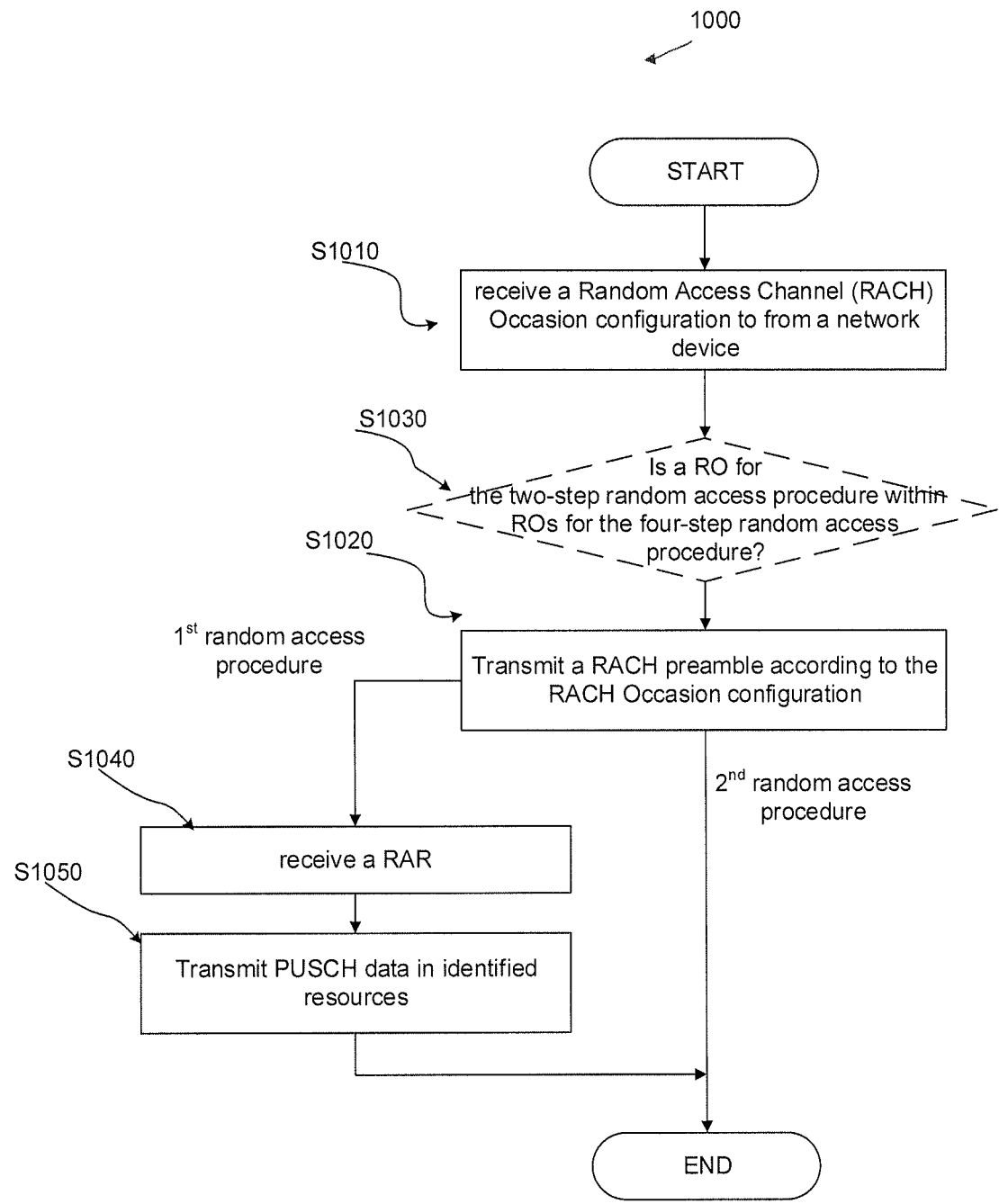
FIG. 10 is a flowchart illustrating a method in a terminal device according to an embodiment of the present disclosure.

FIG. 10 is a flowchart illustrating a method 1000 according to an embodiment of the present disclosure. The method 1000 can be performed in a terminal device, e.g., a UE.

At step S1010, the terminal device receives a Random Access Channel (RACH) Occasion configuration from a network device. The RACH Occasion configuration comprises a first time resource indication identifying at least a first set of time resources in which the terminal device is allowed to transmit a RACH preamble according to a first random access procedure, a first frequency resource indication identifying at least a first set of frequency resources in which the terminal device is allowed to transmit the RACH preamble according to the first random access procedure, a second time resource indication identifying at least a second set of time resources in which the terminal device is allowed to transmit a RACH preamble according to a second random access procedure, and a second frequency resource indication identifying at least a second set of frequency resources in which the terminal device is allowed to transmit the RACH preamble according to the second random access procedure.

At step S1020, the terminal device transmits a RACH preamble according to the RACH Occasion configuration.

In an embodiment, the second set of time resources are at least partly different from the first set of time resources in time domain and/or the second set of frequency resources are at least partly different from the first set of frequency resources in frequency domain. That is, the time resources and/or frequency resources for transmitting a RACH preamble according to the two-step random access procedure are configured separately from those for four-step random access procedure.

In an embodiment, the first time resource indication is in a form of a first RACH configuration table, and the second time resource indication is in a form of a second RACH configuration table different from the first RACH configuration table. In an example, a set of tables (referred to as table set B) is used for the time resource determination for two-step random access procedure, similar to the 3 tables defined in TS 38.211, Tables 6.3.3.2-2, 6.3.3.2-3, 6.3.3.2-4 (referred to as table set A) applied for four-step random access procedure.

In an embodiment, the first and second time resource indications are configured so that the second time resource indication identifies a part in a RACH configuration table and the first time resource indication identifies a different part in the RACH configuration table. That is, Table set A and Table set B are the same, but different rows are configured for the two-step and four-step random access procedures.

In an embodiment, Table set B can be combined within the table set A to form a modified table, and different rows and/or columns in the modifies table are configured for the two-step and four-step random access procedures, respectively. That is, a new RACH configuration table is preconfigured, and the first and second time resource indications may be configured to identify different columns, or different rows in the new RACH configuration.

As an example, Table set A, i.e., the existing RACH configuration table configured for the four-step random access procedure, is reused for Table set B. A separate RACH configuration index is configured for two-step RACH procedure, which indicates a different row in the associated RACH configuration table as compared to the one for four-step random access procedure, so that the OFDM symbols occupied by valid RACH occasions for two-step random access are all different from the OFDM symbols occupied by valid four-step RACH occasions. FIG. 8 illustrates an example where the time resources for the two-step random access procedure are different from those for the four-step random access procedure.

A benefit of using different OFDM symbols and/or different subcarriers for the two-step and four-step RACH procedures is that incorrect operation by Rel-15 UEs that are not capable of two-step RACH operation can be avoided. If a Rel-15 UE transmits a preamble in a symbol and subcarrier that can be used for two-step operation, it will not transmit a PUSCH containing msgA, even though the network would attempt to receive the PUSCH, since Rel-16 UEs capable of two-step operation would transmit the PUSCH when transmitting the preamble in the symbol.

In an example, the frequency resources are separately configured.

In an embodiment, the second frequency resource indication comprises a parameter defining a number of RACH occasions that are frequency division multiplexed in at least one time resource. For example, a parameter "msgA_preamble-FDM" can be configured in "RACH-ConfigGeneric information element". In another embodiment, the parameter defining a number of RACH occasions that are frequency division multiplexed in at least one time resource is configured (e.g., by the network device) by taking at least one of the following parameters into accounts: a number of RACH occasions that are frequency division multiplexed in at least one time resource for the first random access procedure, a preamble format for the second random access procedure, a frequency band for the second random access procedure and a RACH time configuration for the second random access procedure. In still another embodiment, there is no such parameter in the second frequency resource indication. The terminal device may determine a number of RACH occasions that are frequency division multiplexed in at least one time resource for the second random access procedure by taking at least one of the following parameters into accounts: a number of RACH occasions that are frequency division multiplexed at least in one time resource for the first random access procedure, a preamble format for the second random access procedure, a frequency band for the second random access procedure and a RACH time configuration for the second random access procedure.

In an embodiment, the second frequency resource indication comprises a parameter defining an offset of a lowest RACH occasion relative to an index of a PRB. In an example, the PRB is a first PRB in a bandwidth part containing the second set of frequency resources, or a PRB in the first set of frequency resources. The PRB in the first set of frequency resources is a PRB whose index may be the lowest or largest in the first set of frequency resources. The terminal device, upon receiving the parameter included in the second frequency resource indication, may determine the lowest RACH occasion in the second set of frequency resources by at least one of: adding the offset to an index of a first PRB in a bandwidth part containing the second set of frequency resources, adding the offset to an index of a PRB whose index is the lowest in the first set of frequency resources, and adding the offset to an index of a PRB whose index is the largest in the first set of frequency resources. In another example, there is no such parameter defining an offset of a lowest RACH occasion relative to an index of a PRB in the second frequency resource indication. The terminal device may determine a lowest RACH occasion in the second set of frequency resources by adding one or more to an index of a PRB whose index is the largest in the first set of frequency resources, as configured by default.

In another embodiment, the second time resource indication and the second frequency resource indication may indicate that the second set of time resources is a subset of the first set of time resources in time domain and the second set of frequency resources is a subset of the first set of frequency resources in frequency domain.

That is, the four-step ROs are shared by the two-step ROs, and a set of the ROs from four-step RA are shared.

As another example, when a two-step RO overlaps partially or completely with a four-step RO, a predetermined rule can be defined, where the rule can be that only four-step random access procedure is allowed on the four-step ROs when this overlapping happens, two-step random access procedure will be blocked. That is, at step S1030, the terminal device (e.g., UE) determines whether a time-frequency resource within the second set of time resources and the second set of frequency resources to be used for transmitting a RACH preamble according to the two-step random access procedure is within the first set of time resources and within the first set of frequency resources; and if yes, at step 1020, it transmits a RACH preamble in the time-frequency resource according to the four-step random access procedure.

In an embodiment, the second time resource indication and the second frequency resource indication further indicate an association period, and the association period may be configured by (e.g., the network device) taking the following parameters for the second random access procedure into account: a preamble format, a RACH configuration period, an association period configuration, and an association pattern period configuration. For example, only one set of the ROs in some association period for mapping SSBs to RACH occasions for four-step random access procedure are used for two-step random access procedure.

In an embodiment, the second time resource indication and the second frequency resource indication are received via an RRC message.

The subset may be a fixed subset of the RO from the four-step random access procedure, or indicated via a RRC signaling. In an embodiment, the subset of time resources or frequency resources is configured by (e.g., the network device) taking the following parameters for the second random access procedure into account: a number of RACH occasions mapped by a whole set of SSBs in one SSB burst set; a number of SSBs actually transmitted; a RACH configuration index, and whether the spectrum type is paired spectrum or unpaired spectrum.

In an embodiment, the method 1000 further comprises a step S1040 of receiving, from the network device, a Random Access Response (RAR) including an indication that identifies resources in which the terminal device is allowed to transmit PUSCH data, wherein the network device determines that the RACH preamble is associated with the first random access procedure; and a step S1050 of transmitting the PUSCH data in the identified resources. That is, the terminal device takes the four-step random access procedure to access the network device.

In an embodiment, if the terminal device is to transmit the RACH preamble according to the second random access procedure, the method 1000 further comprises: a step of transmitting PUSCH data in a predetermined set of resources in message A. That is, the terminal device takes the two-step random access procedure to access the network device. It shall be noted that the operation of transmitting PUSCH data in a predetermined set of resources occurs at the same time of the operation of transmitting the RACH preamble if the terminal device takes the two-step random access procedure to access the network device.

In an embodiment, even if the terminal device (e.g., UE) transmits a RACH preamble according to the two-step random access procedure, the network device (e.g., gNB) may correctly decode the RACH preamble and know that the RACH preamble is transmitted according to the two-step random access procedure, but receive no PUSCH data or cannot decode the PUSCH data, it transmits a Random Access Response (RAR) to the terminal device by following the two-step random access procedure. Accordingly, the terminal device receives a Random Access Response (RAR) from the network device after a RACH preamble and PUSCH data are transmitted according to the second random access procedure or only a RACH preamble is transmitted according to the second access procedure, wherein the network device determines that the RACH preamble is associated with the second random access procedure but no PUSCH data being received or correctly decoded. That is, the terminal device fails to access the network by taking the two-step random access procedure, and then follows the four-step random access procedure to access the network device.

Because the two-step and four-step ROs are time multiplexed and may be separated by many tens of milliseconds, the UE which is required to use only one of the two-step or four-step ROs needs to wait until the required RO arrives, which is contrary to the low latency behavior desired in two-step RACH operation. Therefore, in some embodiments, a UE is configured to use both the first and second set of ROs, select one of the first and second set of ROs in which to transmit the RACH preamble, and then follow the RACH procedure associated with the RO in which it transmits the RACH preamble. The UE determines whether an upcoming time resource is in the first set of time resource or the second set of time resource, and transmits a RACH preamble according to the first random access procedure if the upcoming time resource is in the first set of time resource and according to the second random access procedure if the upcoming time resource is in the second set of time resource. The UE may use a criterion to select the RO, where the criterion can be to transmit the RACH preamble in the next available RO after the time it determines that a RACH transmission is needed.

The two-step and four-step random access procedures in a cell may be used by different numbers of UEs, and so it may be desirable to control the load on resources used by two-step and four-step random access procedures. One way to do this is to constrain UEs capable of two-step random access procedure to use two-step random access procedure in a first attempt of a random access procedure, and to then allow the UE to use both two-step and four-step resources in a second attempt using the four-step random access procedure if the first attempt is not successful. In such cases, the criteria for RO selection can be to select a RO in the second set of ROs for a first random access attempt, to determine that a second random access attempt is needed, and then to select a RO from either the first or second set of ROs for a second random access attempt.

In some embodiments, the two-step ROs are separately configured (e.g., by the network device), and the second time resource indication and the second frequency resource indication are configured by the network device taking at least one of the following parameters into accounts: a periodicity for the second random access procedure relative to the periodicity for the first random access procedure; a possible collision between the second random access procedure and the first random access procedure; and a possible collision between the second random access procedure with other signals than a RACH preamble.

For example, a periodicity for two-step random access procedure larger than that used for four-step random access procedure can be configured when only a small number of terminal devices are expected to use two-step random access procedure, while a periodicity smaller than that used for four-step random access procedure can be configured when a large number of terminal devices are expected to use two-step random access procedure.

In an embodiment, the time resources are subframes if the RACH preamble is transmitted in a first frequency range (for example, frequencies below 6 GHz), or the time resources are slots (for example, 60 kHz slots) if the RACH preamble is transmitted in a second frequency range (for example, frequencies above 6 GHz).

Figure 11:
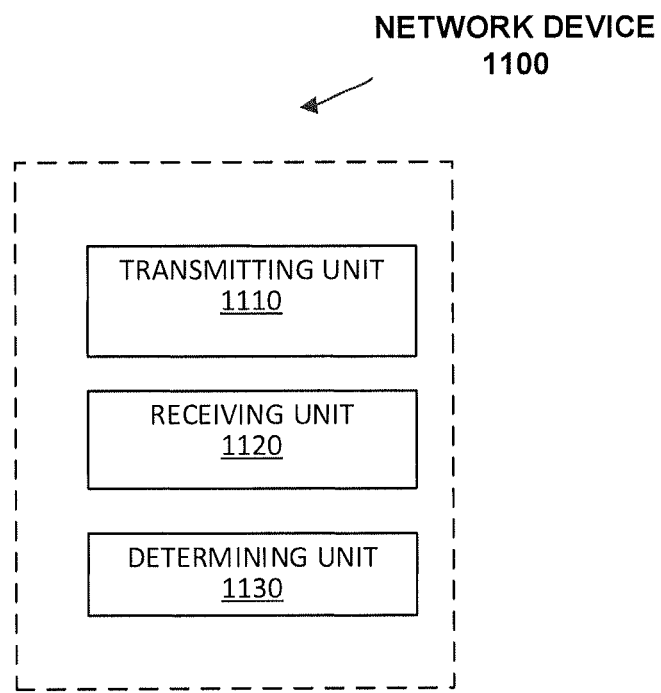
FIG. 11 is a block diagram of a network device according to another embodiment of the present disclosure.

Correspondingly to the method 700 as described above, a network device is provided. FIG. 11 is a block diagram of a network device 1100 according to an embodiment of the present disclosure.

As shown in FIG. 11, the network device 1100 includes a transmitting unit 1110 configured to transmit a Random Access Channel (RACH) Occasion configuration to a terminal device. The RACH Occasion configuration comprises a first time resource indication identifying at least a first set of time resources in which the terminal device is allowed to transmit a RACH preamble according to a first random access procedure, a first frequency resource indication identifying at least a first set of frequency resources in which the terminal device is allowed to transmit the RACH preamble according to the first random access procedure, a second time resource indication identifying at least a second set of time resources in which the terminal device is allowed to transmit a RACH preamble according to a second random access procedure, and a second frequency resource indication identifying at least a second set of frequency resources in which the terminal device is allowed to transmit the RACH preamble according to the second random access procedure.

The network device 1100 further includes a receiving unit 1120 configured to receive a RACH preamble which is transmitted from the terminal device according to the RACH Occasion configuration.

In the embodiment, the second set of time resources are at least partly different from the first set of time resources in time domain and/or the second set of frequency resources are at least partly different from the first set of frequency resources in frequency domain. That is, the time resources and/or frequency resources for transmitting a RACH preamble according to the two-step random access procedure are configured separately from those for four-step random access procedure.

In an embodiment, the first time resource indication is in a form of a first RACH configuration table, and the second time resource indication is in a form of a second RACH configuration table different from the first RACH configuration table. In an example, a set of tables (referred to as table set B) is used for the time resource determination for two-step random access procedure, similar to the 3 tables defined in TS 38.211, Tables 6.3.3.2-2, 6.3.3.2-3, 6.3.3.2-4 (referred to as table set A) applied for four-step random access procedure.

In an embodiment, the first and second time resource indications are configured so that the second time resource indication identifies rows in a RACH configuration table different from rows identified by the first time resource indication in the RACH configuration table. That is, Table set A and Table set B are the same, but different rows are configured for the two-step and four-step random access procedures.

In an embodiment, Table set B can be combined within the table set A to form a modified table, and different rows in the modifies table are configured for the two-step and four-step random access procedures, respectively. That is, a new RACH configuration table is preconfigured, and the first and second time resource indications may be configured to identify different columns, or different rows in the new RACH configuration.

In an embodiment, the second frequency resource indication comprises a parameter defining a number of RACH occasions that are frequency division multiplexed in at least one time resource. For example, a parameter "msgA_preamble-FDM" can be configured in "RACH-ConfigGeneric information element". In another embodiment, the parameter defining a number of RACH occasions that are frequency division multiplexed in at least one time resource is configured by taking at least one of the following parameters into accounts: a number of RACH occasions that are frequency division multiplexed at least in one time resource for the first random access procedure, a preamble format for the second random access procedure, a frequency band for the second random access procedure and a RACH time configuration for the second random access procedure.

In an embodiment, the second frequency resource indication comprises a parameter defining an offset of a lowest RACH occasion relative to an index of a PRB. In an example, the PRB is a first PRB in a bandwidth part containing the second set of frequency resources, or a PRB in the first set of frequency resources. The PRB in the first set of frequency resources is a PRB whose index may be the lowest or largest in the first set of frequency resources. The UE, upon receiving the parameter included in the second frequency resource indication, may determine the lowest RACH occasion in the second set of frequency resources by at least one of: adding the offset to an index of a first PRB in a bandwidth part containing the second set of frequency resources, adding the offset to an index of a PRB whose index is the lowest in the first set of frequency resources, and adding the offset to an index of a PRB whose index is the largest in the first set of frequency resources.

In an embodiment, the network device 1100 may further comprise a determining unit 1130 configured to determine whether the received RACH preamble is associated with the first random access procedure or the second random access procedure. The transmitting unit 1120 is configured to transmit a Random Access Response (RAR) to the terminal device in response to determining that the received RACH preamble is associated with the first random access procedure. That is, if the terminal device (e.g., UE) transmits a RACH preamble according to the four-step random access procedure, the network device 1100 should follow the four-step random access procedure to transmit a RAR to the terminal device after receiving the RACH preamble.

In an embodiment, the transmitting unit 1120 is further configured to transmit a Random Access Response (RAR) to the terminal device in response to receiving a RACH preamble without receiving PUSCH data, wherein the RACH preamble is associated with the second random access procedure. That is, even if the terminal device (e.g., UE) transmits a RACH preamble according to the two-step random access procedure, the network device 1100 may correctly decode the RACH preamble and know that the RACH preamble is transmitted according to the two-step random access procedure, but receive no PUSCH data or cannot decode the PUSCH data, it transmits a Random Access Response (RAR) to the terminal device by following the two-step random access procedure.

In an embodiment, the two-step RACH Occasions (ROs) are separately configured, and the determining unit 1130 is further configured to determine the second time resource indication and the second frequency resource indication by taking at least one of the following parameters into accounts: a periodicity for the second random access procedure relative to the periodicity for the first random access procedure; a possible collision between the second random access procedure and the first random access procedure; and a possible collision between the second random access procedure with other signals than a RACH preamble.

For example, a periodicity for two-step random access procedure larger than that used for four-step random access procedure can be configured when only a small number of terminal devices are expected to use two-step random access procedure, while a periodicity smaller than that used for four-step random access procedure can be configured when a large number of terminal devices are expected to use two-step random access procedure.

The units 1110-1130 can be implemented as a pure hardware solution or as a combination of software and hardware, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 7.

Figure 12:
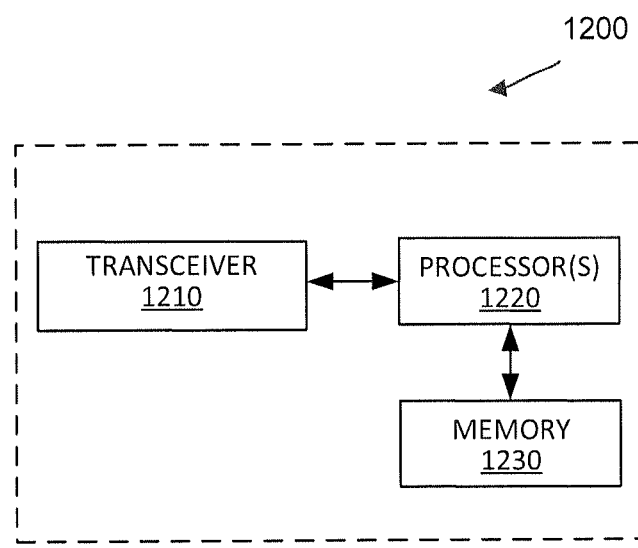
FIG. 12 is a block diagram of a network device according to another embodiment of the present disclosure.

FIG. 12 is a block diagram of a network device 1200 according to another embodiment of the present disclosure.

The network device 1200 includes a transceiver 1210, a processor 1220 and a memory 1230. The memory 1230 contains instructions executable by the processor 1220 whereby the network device 1200 is operative to perform the actions, e.g., of the procedure described earlier in conjunction with FIG. 7. Particularly, the memory 1230 contains instructions executable by the processor 1220 whereby the network device 1200 is operative to transmit a Random Access Channel (RACH) Occasion configuration to a terminal device, and receive a RACH preamble which is transmitted from the terminal device according to the RACH Occasion configuration. The RACH Occasion configuration comprises a first time resource indication identifying at least a first set of time resources in which the terminal device is allowed to transmit a RACH preamble according to a first random access procedure, a first frequency resource indication identifying at least a first set of frequency resources in which the terminal device is allowed to transmit the RACH preamble according to the first random access procedure, a second time resource indication identifying at least a second set of time resources in which the terminal device is allowed to transmit a RACH preamble according to a second random access procedure, and a second frequency resource indication identifying at least a second set of frequency resources in which the terminal device is allowed to transmit the RACH preamble according to the second random access procedure.

In the embodiment, the second set of time resources are at least partly different from the first set of time resources in time domain and/or the second set of frequency resources are at least partly different from the first set of frequency resources in frequency domain. That is, the time resources and/or frequency resources for transmitting a RACH preamble according to the two-step random access procedure are configured separately from those for four-step random access procedure.

In an embodiment, the first time resource indication is in a form of a first RACH configuration table, and the second time resource indication is in a form of a second RACH configuration table different from the first RACH configuration table. In an example, a set of tables (referred to as table set B) is used for the time resource determination for two-step random access procedure, similar to the 3 tables defined in TS 38.211, Tables 6.3.3.2-2, 6.3.3.2-3, 6.3.3.2-4 (referred to as table set A) applied for four-step random access procedure.

In an embodiment, the first and second time resource indications are configured so that the second time resource indication identifies rows in a RACH configuration table different from rows identified by the first time resource indication in the RACH configuration table. That is, Table set A and Table set B are the same, but different rows are configured for the two-step and four-step random access procedures.

In an embodiment, Table set B can be combined within the table set A to form a modified table, and different rows in the modifies table are configured for the two-step and four-step random access procedures, respectively. That is, a new RACH configuration table is preconfigured, and the first and second time resource indications may be configured to identify different columns, or different rows in the new RACH configuration.

In an embodiment, the second frequency resource indication comprises a parameter defining a number of RACH occasions that are frequency division multiplexed in at least one time resource. For example, a parameter "msgA_preamble-FDM" can be configured in "RACH-ConfigGeneric information element". In another embodiment, the parameter defining a number of RACH occasions that are frequency division multiplexed in at least one time resource is configured by taking at least one of the following parameters into accounts: a number of RACH occasions that are frequency division multiplexed at least in one time resource for the first random access procedure, a preamble format for the second random access procedure, a frequency band for the second random access procedure and a RACH time configuration for the second random access procedure.

In an embodiment, the second frequency resource indication comprises a parameter defining an offset of a lowest RACH occasion relative to an index of a PRB. In an example, the PRB is a first PRB in a bandwidth part containing the second set of frequency resources, or a PRB in the first set of frequency resources. The PRB in the first set of frequency resources is a PRB whose index may be the lowest or largest in the first set of frequency resources. The UE, upon receiving the parameter included in the second frequency resource indication, may determine the lowest RACH occasion in the second set of frequency resources by at least one of: adding the offset to an index of a first PRB in a bandwidth part containing the second set of frequency resources, adding the offset to an index of a PRB whose index is the lowest in the first set of frequency resources, and adding the offset to an index of a PRB whose index is the largest in the first set of frequency resources.

In an embodiment, the memory 1230 contains instructions executable by the processor 1220 whereby the network device 1200 is further operative to determine whether the received RACH preamble is associated with the first random access procedure or the second random access procedure, and transmit a Random Access Response (RAR) to the terminal device in response to determining that the received RACH preamble is associated with the first random access procedure. That is, if the terminal device (e.g., UE) transmits a RACH preamble according to the four-step random access procedure, the network device 1200 should follow the four-step random access procedure to transmit a RAR to the terminal device after receiving the RACH preamble.

In an embodiment, the memory 1230 contains instructions executable by the processor 1220 whereby the network device 1200 is further operative to transmit a Random Access Response (RAR) to the terminal device in response to receiving a RACH preamble without receiving PUSCH data, wherein the RACH preamble is associated with the second random access procedure. That is, even if the terminal device (e.g., UE) transmits a RACH preamble according to the two-step random access procedure, the network device 1200 correctly decodes the RACH preamble and knows that the RACH preamble is transmitted according to the two-step random access procedure, but receives no PUSCH data or cannot decode the PUSCH data, it transmits a Random Access Response (RAR) to the terminal device by following the two-step random access procedure.

In an embodiment, the two-step RACH Occasions (ROs) are separately configured, and the memory 1230 contains instructions executable by the processor 1220 whereby the network device 1200 is further operative to configure the second time resource indication and the second frequency resource indication by taking at least one of the following parameters into accounts: a periodicity for the second random access procedure relative to the periodicity for the first random access procedure; a possible collision between the second random access procedure and the first random access procedure; and a possible collision between the second random access procedure with other signals than a RACH preamble.

For example, a periodicity for two-step random access procedure larger than that used for four-step random access procedure can be configured when only a small number of terminal devices are expected to use two-step random access procedure, while a periodicity smaller than that used for four-step random access procedure can be configured when a large number of terminal devices are expected to use two-step random access procedure.

Figure 13:
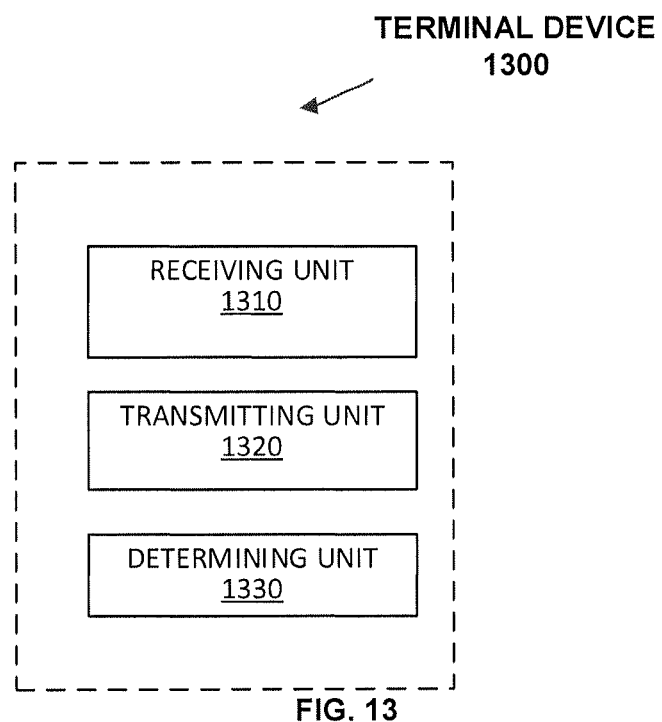
FIG. 13 is a block diagram of a terminal device according to an embodiment of the present disclosure.

Correspondingly to the method 1000 as described above, a terminal device is provided. FIG. 13 is a block diagram of a terminal device 1300 according to an embodiment of the present disclosure.

As shown in FIG. 13, the terminal device 1300 includes a receiving unit 1110 configured to receive a Random Access Channel (RACH) Occasion configuration from a network device. The terminal device 1300 further includes a transmitting unit 1320 configured to transmit a RACH preamble according to the RACH Occasion configuration. The RACH Occasion configuration comprises a first time resource indication identifying at least a first set of time resources in which the terminal device is allowed to transmit a RACH preamble according to a first random access procedure, a first frequency resource indication identifying at least a first set of frequency resources in which the terminal device is allowed to transmit the RACH preamble according to the first random access procedure, a second time resource indication identifying at least a second set of time resources in which the terminal device is allowed to transmit a RACH preamble according to a second random access procedure, and a second frequency resource indication identifying at least a second set of frequency resources in which the terminal device is allowed to transmit the RACH preamble according to the second random access procedure.

In an embodiment, the second set of time resources are at least partly different from the first set of time resources in time domain and/or the second set of frequency resources are at least partly different from the first set of frequency resources in frequency domain. That is, the time resources and/or frequency resources for transmitting a RACH preamble according to the two-step random access procedure are configured separately from those for four-step random access procedure.

In an embodiment, the first time resource indication is in a form of a first RACH configuration table, and the second time resource indication is in a form of a second RACH configuration table different from the first RACH configuration table. In an example, a set of tables (referred to as table set B) is used for the time resource determination for two-step random access procedure, similar to the 3 tables defined in TS 38.211, Tables 6.3.3.2-2, 6.3.3.2-3, 6.3.3.2-4 (referred to as table set A) applied for four-step random access procedure.

In an embodiment, the first and second time resource indications are configured so that the second time resource indication identifies a part in a RACH configuration table and the first time resource indication identifies a different part in the RACH configuration table. That is, Table set A and Table set B are the same, but different rows are configured for the two-step and four-step random access procedures.

In an embodiment, Table set B can be combined within the table set A to form a modified table, and different rows and/or columns in the modifies table are configured for the two-step and four-step random access procedures, respectively. That is, a new RACH configuration table is preconfigured, and the first and second time resource indications may be configured to identify different columns, or different rows in the new RACH configuration.

In an embodiment, the second frequency resource indication comprises a parameter defining a number of RACH occasions that are frequency division multiplexed in at least one time resource. For example, a parameter "msgA_preamble-FDM" can be configured in "RACH-ConfigGeneric information element". In another embodiment, the parameter defining a number of RACH occasions that are frequency division multiplexed in at least one time resource is configured (e.g., by the network device) by taking at least one of the following parameters into accounts: a number of RACH occasions that are frequency division multiplexed in at least one time resource for the first random access procedure, a preamble format for the second random access procedure, a frequency band for the second random access procedure and a RACH time configuration for the second random access procedure. In still another embodiment, there is no such parameter in the second frequency resource indication. The terminal device may determine a number of RACH occasions that are frequency division multiplexed in at least one time resource for the second random access procedure by taking at least one of the following parameters into accounts: a number of RACH occasions that are frequency division multiplexed at least in one time resource for the first random access procedure, a preamble format for the second random access procedure, a frequency band for the second random access procedure and a RACH time configuration for the second random access procedure.

In an embodiment, the second frequency resource indication comprises a parameter defining an offset of a lowest RACH occasion relative to an index of a PRB. In an example, the PRB is a first PRB in a bandwidth part containing the second set of frequency resources, or a PRB in the first set of frequency resources. The PRB in the first set of frequency resources is a PRB whose index may be the lowest or largest in the first set of frequency resources. The terminal device 1300, upon receiving the parameter included in the second frequency resource indication, may determine the lowest RACH occasion in the second set of frequency resources by at least one of: adding the offset to an index of a first PRB in a bandwidth part containing the second set of frequency resources, adding the offset to an index of a PRB whose index is the lowest in the first set of frequency resources, and adding the offset to an index of a PRB whose index is the largest in the first set of frequency resources. In another example, there is no such parameter defining an offset of a lowest RACH occasion relative to an index of a PRB in the second frequency resource indication. The terminal device 1300 may determine a lowest RACH occasion in the second set of frequency resources by adding one or more to an index of a PRB whose index is the largest in the first set of frequency resources, as configured by default.

In another embodiment, the second time resource indication and the second frequency resource indication may indicate that the second set of time resources is a subset of the first set of time resources in time domain and the second set of frequency resources is a subset of the first set of frequency resources in frequency domain.

That is, the four-step ROs are shared by the two-step ROs, and a set of the ROs from four-step RA are shared.

As another example, when a two-step RO overlaps partially or completely with a four-step RO, a predetermined rule can be defined, where the rule can be that only four-step random access procedure is allowed on the four-step ROs when this overlapping happens, two-step random access procedure will be blocked. That is, the terminal device 1300 may further comprise a determining unit 1330 configured to determine whether a time-frequency resource within the second set of time resources and the second set of frequency resources to be used for transmitting a RACH preamble according to the two-step random access procedure is within the first set of time resources and within the first set of frequency resources. The transmitting unit 1320 is configured to transmit a RACH preamble in the time-frequency resource according to the four-step random access procedure if the determining unit 1330 determines that a time-frequency resource within the second set of time resources and the second set of frequency resources to be used for transmitting a RACH preamble according to the two-step random access procedure is within the first set of time resources and within the first set of frequency resource.

In an embodiment, the second time resource indication and the second frequency resource indication further indicate an association period, and the association period may be configured by (e.g., the network device) taking the following parameters for the second random access procedure into account: a preamble format, a RACH configuration period, an association period configuration, and an association pattern period configuration. For example, only one set of the ROs in some association period for mapping SSBs to RACH occasions for four-step random access procedure are used for two-step random access procedure.

In an embodiment, the second time resource indication and the second frequency resource indication are received via an RRC message.

The subset may be a fixed subset of the RO from the four-step random access procedure, or indicated via a RRC signaling. In an embodiment, the subset of time resources or frequency resources is configured by (e.g., the network device) taking the following parameters for the second random access procedure into account: a number of RACH occasions mapped by a whole set of SSBs in one SSB burst set; a number of SSBs actually transmitted; a RACH configuration index, and whether the spectrum type is paired spectrum or unpaired spectrum.

In an embodiment, the receiving unit 1310 is further configured to receive, from the network device, a Random Access Response (RAR) including an indication that identifies resources in which the terminal device is allowed to transmit PUSCH data, wherein the network device determines that the RACH preamble is associated with the first random access procedure, and the transmitting unit 1320 is further configured to transmit the PUSCH data in the identified resources. That is, the terminal device 1300 takes the four-step random access procedure to access the network device.

In an embodiment, the transmitting unit 1320 is further configured to transmit PUSCH data in a predetermined set of resources in message A if the transmitting unit 1320 is to transmit the RACH preamble according to the second random access procedure. That is, the terminal device 1300 takes the two-step random access procedure to access the network device. It shall be noted that the operation of transmitting PUSCH data in a predetermined set of resources occurs at the same time of the operation of transmitting the RACH preamble if the terminal device 1300 takes the two-step random access procedure to access the network device.

In an embodiment, even if the terminal device 1300 transmits a RACH preamble according to the two-step random access procedure, the network device (e.g., gNB) may correctly decode the RACH preamble and knows that the RACH preamble is transmitted according to the two-step random access procedure, but receives no PUSCH data or cannot decodes the PUSCH data, it transmits a Random Access Response (RAR) to the terminal device by following the two-step random access procedure. Accordingly, the transmitting unit 1320 is configured to receive a Random Access Response (RAR) from the network device after a RACH preamble and PUSCH data are transmitted according to the second random access procedure or only a RACH preamble is transmitted according to the second access procedure, wherein the network device determines that the RACH preamble is associated with the second random access procedure but no PUSCH data being received or correctly decoded. That is, the terminal device 1300 fails to access the network by taking the two-step random access procedure, and then follows the four-step random access procedure to access the network device.

Because the two-step and four-step ROs are time multiplexed and may be separated by many tens of milliseconds, the terminal device which is required to use only one of the two-step or four-step ROs needs to wait until the required RO arrives, which is contrary to the low latency behavior desired in two-step RACH operation. Therefore, in some embodiments, a terminal device is configured to use both the first and second set of ROs, selects one of the first and second set of ROs in which to transmit the RACH preamble, and then follows the random access procedure associated with the RO in which it transmits the RACH preamble. The terminal device 1300 determines whether an upcoming time resource is in the first set of time resource or the second set of time resource, and transmits a RACH preamble according to the first random access procedure if the upcoming time resource is in the first set of time resource and according to the second random access procedure if the upcoming time resource is in the second set of time resource. The terminal device 1300 may use a criterion to select the RO, where the criterion can be to transmit the RACH preamble in the next available RO after the time it determines that a RACH transmission is needed.

The two-step and four-step random access procedures in a cell may be used by different numbers of terminal devises, and so it may be desirable to control the load on resources used by two-step and four-step random access procedures. One way to do this is to constrain terminal devices capable of two-step random access procedure to use two-step random access procedure in a first attempt of a random access procedure, and to then allow the terminal device to use both two-step and four-step resources in a second attempt using the four-step random access procedure if the first attempt is not successful. In such cases, the criteria for RO selection can be to select a RO in the second set of ROs for a first random access attempt, to determine that a second random access attempt is needed, and then to select a RO from either the first or second set of ROs for a second random access attempt.

In some embodiments, the two-step ROs are separately configured (e.g., by the network device), and the second time resource indication and the second frequency resource indication are configured by the network device taking at least one of the following parameters into accounts: a periodicity for the second random access procedure relative to the periodicity for the first random access procedure; a possible collision between the second random access procedure and the first random access procedure; and a possible collision between the second random access procedure with other signals than a RACH preamble.

For example, a periodicity for two-step random access procedure larger than that used for four-step random access procedure can be configured when only a small number of terminal devices are expected to use two-step random access procedure, while a periodicity smaller than that used for four-step random access procedure can be configured when a large number of terminal devices are expected to use two-step random access procedure.

In an embodiment, the time resources are subframes if the RACH preamble is transmitted in a first frequency range (for example, frequencies below 6 GHz), or the time resources are slots (for example, 60 kHz slots) if the RACH preamble is transmitted in a second frequency range (for example, frequencies above 6 GHz).

The units 1310-1330 can be implemented as a pure hardware solution or as a combination of software and hardware, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 10.

Figure 14:
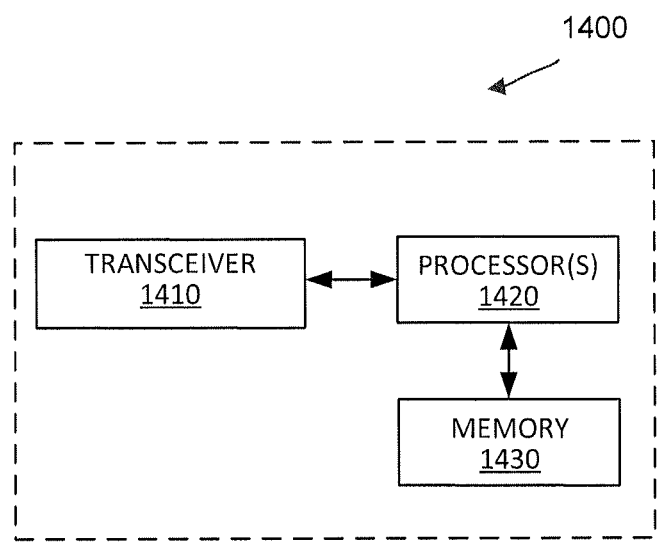
FIG. 14 is a block diagram of a terminal device according to another embodiment of the present disclosure.

FIG. 14 is a block diagram of a terminal device 1400 according to another embodiment of the present disclosure.

The terminal device 1400 includes a transceiver 1410, a processor 1420 and a memory 1430. The memory 1430 contains instructions executable by the processor 1420 whereby the terminal device 1400 is operative to perform the actions, e.g., of the procedure described earlier in conjunction with FIG. 10. Particularly, the memory 1430 contains instructions executable by the processor 1420 whereby the terminal device 1400 is operative to receive a Random Access Channel (RACH) Occasion configuration from a network device, and transmit RACH preamble according to the RACH Occasion configuration. The RACH Occasion configuration comprises a first time resource indication identifying at least a first set of time resources in which the terminal device is allowed to transmit a RACH preamble according to a first random access procedure, a first frequency resource indication identifying at least a first set of frequency resources in which the terminal device is allowed to transmit the RACH preamble according to the first random access procedure, a second time resource indication identifying at least a second set of time resources in which the terminal device is allowed to transmit a RACH preamble according to a second random access procedure, and a second frequency resource indication identifying at least a second set of frequency resources in which the terminal device is allowed to transmit the RACH preamble according to the second random access procedure.

In an embodiment, the second set of time resources are at least partly different from the first set of time resources in time domain and/or the second set of frequency resources are at least partly different from the first set of frequency resources in frequency domain. That is, the time resources and/or frequency resources for transmitting a RACH preamble according to the two-step random access procedure are configured separately from those for four-step random access procedure.

In an embodiment, the first time resource indication is in a form of a first RACH configuration table, and the second time resource indication is in a form of a second RACH configuration table different from the first RACH configuration table. In an example, a set of tables (referred to as table set B) is used for the time resource determination for two-step random access procedure, similar to the 3 tables defined in TS 38.211, Tables 6.3.3.2-2, 6.3.3.2-3, 6.3.3.2-4 (referred to as table set A) applied for four-step random access procedure.

In an embodiment, the first and second time resource indications are configured so that the second time resource indication identifies a part in a RACH configuration table and the first time resource indication identifies a different part in the RACH configuration table. That is, Table set A and Table set B are the same, but different rows are configured for the two-step and four-step random access procedures.

In an embodiment, Table set B can be combined within the table set A to form a modified table, and different rows and/or columns in the modifies table are configured for the two-step and four-step random access procedures, respectively. That is, a new RACH configuration table is preconfigured, and the first and second time resource indications may be configured to identify different columns, or different rows in the new RACH configuration.

In an embodiment, the second frequency resource indication comprises a parameter defining a number of RACH occasions that are frequency division multiplexed in at least one time resource. For example, a parameter "msgA_preamble-FDM" can be configured in "RACH-ConfigGeneric information element". In another embodiment, the parameter defining a number of RACH occasions that are frequency division multiplexed in at least one time resource is configured (e.g., by the network device) by taking at least one of the following parameters into accounts: a number of RACH occasions that are frequency division multiplexed in at least one time resource for the first random access procedure, a preamble format for the second random access procedure, a frequency band for the second random access procedure and a RACH time configuration for the second random access procedure. In still another embodiment, there is no such parameter in the second frequency resource indication. The terminal device 1400 may determine a number of RACH occasions that are frequency division multiplexed in at least one time resource for the second random access procedure by taking at least one of the following parameters into accounts: a number of RACH occasions that are frequency division multiplexed at least in one time resource for the first random access procedure, a preamble format for the second random access procedure, a frequency band for the second random access procedure and a RACH time configuration for the second random access procedure.

In an embodiment, the second frequency resource indication comprises a parameter defining an offset of a lowest RACH occasion relative to an index of a PRB. In an example, the PRB is a first PRB in a bandwidth part containing the second set of frequency resources, or a PRB in the first set of frequency resources. The PRB in the first set of frequency resources is a PRB whose index may be the lowest or largest in the first set of frequency resources. The terminal device 1400, upon receiving the parameter included in the second frequency resource indication, may determine the lowest RACH occasion in the second set of frequency resources by at least one of: adding the offset to an index of a first PRB in a bandwidth part containing the second set of frequency resources, adding the offset to an index of a PRB whose index is the lowest in the first set of frequency resources, and adding the offset to an index of a PRB whose index is the largest in the first set of frequency resources. In another example, there is no such parameter defining an offset of a lowest RACH occasion relative to an index of a PRB in the second frequency resource indication. The terminal device 1400 may determine a lowest RACH occasion in the second set of frequency resources by adding one or more to an index of a PRB whose index is the largest in the first set of frequency resources, as configured by default.

In another embodiment, the second time resource indication and the second frequency resource indication may indicate that the second set of time resources is a subset of the first set of time resources in time domain and the second set of frequency resources is a subset of the first set of frequency resources in frequency domain.

That is, the four-step ROs are shared by the two-step ROs, and a set of the ROs from four-step RA are shared.

As another example, when a two-step RO overlaps partially or completely with a four-step RO, a predetermined rule can be defined, where the rule can be that only four-step random access procedure is allowed on the four-step ROs when this overlapping happens, two-step random access procedure will be blocked. That is, the memory 1430 contains instructions executable by the processor 1420 whereby the terminal device 1400 is further operative to determine whether a time-frequency resource within the second set of time resources and the second set of frequency resources to be used for transmitting a RACH preamble according to the two-step random access procedure is within the first set of time resources and within the first set of frequency resources; and if yes, transmit a RACH preamble in the time-frequency resource according to the four-step random access procedure.

In an embodiment, the second time resource indication and the second frequency resource indication further indicate an association period, and the association period may be configured by (e.g., the network device) taking the following parameters for the second random access procedure into account: a preamble format, a RACH configuration period, an association period configuration, and an association pattern period configuration. For example, only one set of the ROs in some association period for mapping SSBs to RACH occasions for four-step random access procedure are used for two-step random access procedure.

In an embodiment, the second time resource indication and the second frequency resource indication are received via an RRC message.

The subset may be a fixed subset of the RO from the four-step random access procedure, or indicated via a RRC signaling. In an embodiment, the subset of time resources or frequency resources is configured by (e.g., the network device) taking the following parameters for the second random access procedure into account: a number of RACH occasions mapped by a whole set of SSBs in one SSB burst set; a number of SSBs actually transmitted; a RACH configuration index, and whether the spectrum type is paired spectrum or unpaired spectrum.

In an embodiment, the memory 1430 contains instructions executable by the processor 1420 whereby the terminal device 1400 is further operative to: receive, from the network device, a Random Access Response (RAR) including an indication that identifies resources in which the terminal device is allowed to transmit PUSCH data, wherein the network device determines that the RACH preamble is associated with the first random access procedure; and transmit the PUSCH data in the identified resources. That is, the terminal device 1400 takes the four-step random access procedure to access the network device.

In an embodiment, the memory 1430 contains instructions executable by the processor 1420 whereby the terminal device 1400 is further operative to: transmit PUSCH data in a predetermined set of resources in message A if the terminal device 1400 is to transmit the RACH preamble according to the second random access procedure. That is, the terminal device 1400 takes the two-step random access procedure to access the network device. It shall be noted that the operation of transmitting PUSCH data in a predetermined set of resources occurs at the same time of the operation of transmitting the RACH preamble if the terminal device takes the two-step random access procedure to access the network device.

In an embodiment, even if the terminal device (e.g., UE) transmits a RACH preamble according to the two-step random access procedure, the network device (e.g., gNB) may correctly decode the RACH preamble and know that the RACH preamble is transmitted according to the two-step random access procedure, but receive no PUSCH data or cannot decode the PUSCH data, it transmits a Random Access Response (RAR) to the terminal device by following the two-step random access procedure. Accordingly, the terminal device receives a Random Access Response (RAR) from the network device after a RACH preamble and PUSCH data are transmitted according to the second random access procedure or only a RACH preamble is transmitted according to the second access procedure, wherein the network device determines that the RACH preamble is associated with the second random access procedure but no PUSCH data being received or correctly decoded. That is, the terminal device 1400 fails to access the network by taking the two-step random access procedure, and then follows the four-step random access procedure to access the network device.

Because the two-step and four-step ROs are time multiplexed and may be separated by many tens of milliseconds, the terminal device which is required to use only one of the two-step or four-step ROs needs to wait until the required RO arrives, which is contrary to the low latency behavior desired in two-step RACH random access procedure. Therefore, in some embodiments, a terminal device is configured to use both the first and second set of ROs, selects one of the first and second set of ROs in which to transmit the RACH preamble, and then follows the random access procedure associated with the RO in which it transmits the RACH preamble. The terminal device determines whether an upcoming time resource is in the first set of time resource or the second set of time resource, and transmits a RACH preamble according to the first random access procedure if the upcoming time resource is in the first set of time resource and according to the second random access procedure if the upcoming time resource is in the second set of time resource. The terminal device may use a criterion to select the RO, where the criterion can be to transmit the RACH preamble in the next available RO after the time it determines that a RACH transmission is needed.

The two-step and four-step random access procedures in a cell may be used by different numbers of terminal devices, and so it may be desirable to control the load on resources used by two-step and four-step random access procedures. One way to do this is to constrain terminal devices capable of two-step random access procedure to use two-step random access procedure in a first attempt of a random access procedure, and to then allow the terminal device to use both two-step and four-step resources in a second attempt using the four-step random access procedure if the first attempt is not successful. In such cases, the criteria for RO selection can be to select a RO in the second set of ROs for a first random access attempt, to determine that a second random access attempt is needed, and then to select a RO from either the first or second set of ROs for a second random access attempt.

In some embodiments, the two-step ROs are separately configured (e.g., by the network device), and the second time resource indication and the second frequency resource indication are configured by the network device taking at least one of the following parameters into accounts: a periodicity for the second random access procedure relative to the periodicity for the first random access procedure; a possible collision between the second random access procedure and the first random access procedure; and a possible collision between the second random access procedure with other signals than a RACH preamble.

For example, a periodicity for two-step random access procedure larger than that used for four-step random access procedure can be configured when only a small number of terminal devices are expected to use two-step random access procedure, while a periodicity smaller than that used for four-step random access procedure can be configured when a large number of terminal devices are expected to use two-step random access procedure.

In an embodiment, the time resources are subframes if the RACH preamble is transmitted in a first frequency range (for example, frequencies below 6 GHz), or the time resources are slots (for example, 60 kHz slots) if the RACH preamble is transmitted in a second frequency range (for example, frequencies above 6 GHz).

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the processor 1220 causes the network device 1200 to perform the actions, e.g., of the procedure described earlier in conjunction with FIG. 7; or code/computer readable instructions, which when executed by the processor 1420 causes the terminal device 1400 to perform the actions, e.g., of the procedure described earlier in conjunction with FIG. 10.

The computer program product may be configured as a computer program code structured in computer program modules. The computer program modules could essentially perform the actions of the flow illustrated in FIG. 7 or FIG. 10.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a non-transitory computer readable storage medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

Figure 15:
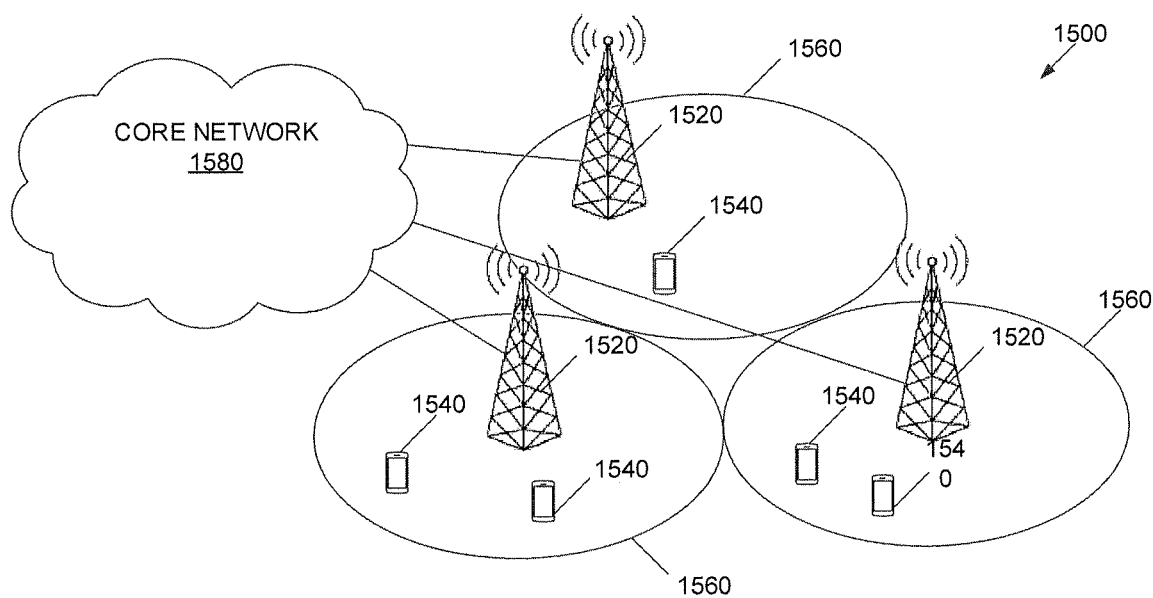
FIG. 15 illustrates one example of a wireless communication system in which embodiments of the present disclosure may be implemented.

FIG. 15 illustrates one example of a wireless communication system 1500 in which embodiments of the present disclosure may be implemented. The wireless communication system 1500 may be a cellular communications system such as, for example, a 5G New Radio (NR) network or an LTE cellular communications system. As illustrated, in this example, the wireless communication system 1500 includes a plurality of radio access nodes 1520 (e.g., evolved Node B:s (eNBs), 5G base stations which are referred to as gNBs, or other base stations or similar) and a plurality of wireless communication devices 1540. The wireless communication system 1500 is organized into cells 160, which are connected to a core network 1580 via the corresponding radio access nodes 1520. The radio access nodes 1520 are capable of communicating with the wireless communication devices 1540.

The radio access node 1520 may function as described with reference to network device in the embodiments of the present disclosure, and the wireless communication device 1540 may function as described with reference to mobile device in the embodiments of the present disclosure.

For example, the radio access node 1520 transmits a Random Access Channel (RACH) Occasion configuration to the wireless communication device 1540. The RACH Occasion configuration comprises a first time resource indication identifying at least a first set of time resources in which the terminal device is allowed to transmit a RACH preamble according to a first random access procedure, a first frequency resource indication identifying at least a first set of frequency resources in which the terminal device is allowed to transmit the RACH preamble according to the first random access procedure, a second time resource indication identifying at least a second set of time resources in which the terminal device is allowed to transmit a RACH preamble according to a second random access procedure, and a second frequency resource indication identifying at least a second set of frequency resources in which the terminal device is allowed to transmit the RACH preamble according to the second random access procedure.

The wireless communication device 1540 receives the RACH occasion configuration from the radio access node 1520 and transmits a RACH preamble according to the RACH Occasion configuration.

In an embodiment, the second set of time resources are at least partly different from the first set of time resources in time domain and/or the second set of frequency resources are at least partly different from the first set of frequency resources in frequency domain. That is, the time resources and/or frequency resources for transmitting a RACH preamble according to the two-step random access procedure are configured separately from those for four-step random access procedure.

In an embodiment, the first time resource indication is in a form of a first RACH configuration table, and the second time resource indication is in a form of a second RACH configuration table different from the first RACH configuration table. In an example, a set of tables (referred to as table set B) is used for the time resource determination for two-step random access procedure, similar to the 3 tables defined in TS 38.211, Tables 6.3.3.2-2, 6.3.3.2-3, 6.3.3.2-4 (referred to as table set A) applied for four-step random access procedure.

In an embodiment, the first and second time resource indications are configured so that the second time resource indication identifies a part in a RACH configuration table and the first time resource indication identifies a different part in the RACH configuration table. That is, Table set A and Table set B are the same, but different rows are configured for the two-step and four-step random access procedures.

In an embodiment, Table set B can be combined within the table set A to form a modified table, and different rows and/or columns in the modifies table are configured for the two-step and four-step random access procedures, respectively. That is, a new RACH configuration table is preconfigured, and the first and second time resource indications may be configured to identify different columns, or different rows in the new RACH configuration.

As an example, Table set A, i.e., the existing RACH configuration table configured for the four-step random access procedure, is reused for Table set B.

In an embodiment, the second frequency resource indication comprises a parameter defining a number of RACH occasions that are frequency division multiplexed in at least one time resource. For example, a parameter "msgA_preamble-FDM" can be configured in "RACH-ConfigGeneric information element". In another embodiment, the parameter defining a number of RACH occasions that are frequency division multiplexed in at least one time resource is configured by the radio access node 1520 taking at least one of the following parameters into accounts: a number of RACH occasions that are frequency division multiplexed in at least one time resource for the first random access procedure, a preamble format for the second random access procedure, a frequency band for the second random access procedure and a RACH time configuration for the second random access procedure. In still another embodiment, there is no such parameter in the second frequency resource indication. The wireless communication device 1540 may determine a number of RACH occasions that are frequency division multiplexed in at least one time resource for the second random access procedure by taking at least one of the following parameters into accounts: a number of RACH occasions that are frequency division multiplexed at least in one time resource for the first random access procedure, a preamble format for the second random access procedure, a frequency band for the second random access procedure and a RACH time configuration for the second random access procedure.

In an embodiment, the second frequency resource indication comprises a parameter defining an offset of a lowest RACH occasion relative to an index of a PRB. In an example, the PRB is a first PRB in a bandwidth part containing the second set of frequency resources, or a PRB in the first set of frequency resources. The PRB in the first set of frequency resources is a PRB whose index may be the lowest or largest in the first set of frequency resources. The wireless communication device 1540, upon receiving the parameter included in the second frequency resource indication, may determine the lowest RACH occasion in the second set of frequency resources by at least one of: adding the offset to an index of a first PRB in a bandwidth part containing the second set of frequency resources, adding the offset to an index of a PRB whose index is the lowest in the first set of frequency resources, and adding the offset to an index of a PRB whose index is the largest in the first set of frequency resources. In another example, there is no such parameter defining an offset of a lowest RACH occasion relative to an index of a PRB in the second frequency resource indication. The wireless communication device 1540 may determine a lowest RACH occasion in the second set of frequency resources by adding one or more to an index of a PRB whose index is the largest in the first set of frequency resources, as configured by default.

For example, a parameter "msgA_preamble-FrequencyStart" can be configured in "RACH-ConfigGeneric information element". As another example, an offset value FrequencyStartOffset is configured in "RACH-ConfigGeneric information element". The FrequencyStartOffset can be added to the start frequency of 1st RO for the four-step random access procedure in one time instance msg1-FrequencyStart to determine a start frequency of the 1st RO for the two-step random access procedure in one time instance msgA_preamble-FrequencyStart: i.e.

$$msgA\text{\_preamble-FrequencyStart} = msg1\text{-FrequencyStart} + \text{FrequencyStartOffset}$$

where the FrequencyStartOffset can be either a fixed value or a predetermined value or RRC configured. The whole frequency band of the ROs for the four-step procedure in one time instance depends on the number of ROs frequency division multiplexed in on time instance and the preamble format.

In an embodiment, the radio access node 1520 may determine whether the received RACH preamble is associated with the first random access procedure or the second random access procedure; and transmit a Random Access Response (RAR) to the terminal device in response to determining that the received RACH preamble is associated with the first random access procedure. That is, if the wireless communication device 1540 transmits a RACH preamble according to the four-step random access procedure, the radio access node 1520 should follow the four-step random access procedure to transmit a RAR to the terminal device after receiving the RACH preamble. Accordingly, the wireless communication device 1540 receives the RAR including an indication that identifies resources in which the wireless communication device 1540 allowed to transmit PUSCH data, In an embodiment, the radio access node 1520 may transmit a Random Access Response (RAR) to the wireless communication device 1540 in response to receiving a RACH preamble without receiving PUSCH data, wherein the RACH preamble is associated with the second random access procedure. That is, even if the wireless communication device 1540 transmits a RACH preamble according to the two-step random access procedure, the radio access node 1520 may correctly decode the RACH preamble and know that the RACH preamble is transmitted according to the two-step random access procedure, but receive no PUSCH data or cannot decode the PUSCH data, it transmits a Random Access Response (RAR) to the wireless communication device 1540 by following the two-step random access procedure.

If the wireless communication device 1540 is to transmit the RACH preamble according to the second random access procedure, it transmits PUSCH data in a predetermined set of resources in message A. That is, it takes the two-step random access procedure to access the network.

When the two-step RACH Occasions (ROs) are separately configured, the second time resource indication and the second frequency resource indication are configured by the radio access node 1520 taking at least one of the following parameters into accounts: a periodicity for the second random access procedure relative to the periodicity for the first random access procedure; a possible collision between the second random access procedure and the first random access procedure; and a possible collision between the second random access procedure with other signals than a RACH preamble.

For example, a periodicity for two-step random access procedure larger than that used for four-step random access procedure can be configured when only a small number of wireless communication devices are expected to use two-step random access procedure, while a periodicity smaller than that used for four-step random access procedure can be configured when a large number of wireless communication devices are expected to use two-step random access procedure.

As another example, when a two-step RO overlaps partially or completely with a four-step RO, a predetermined rule can be defined, where the rule can be that only four-step random access procedure is allowed on the four-step ROs when this overlapping happens, two-step random access procedure will be blocked. That is, the wireless communication device 1540 determines whether a time-frequency resource within the second set of time resources and the second set of frequency resources to be used for transmitting a RACH preamble according to the two-step random access procedure is within the first set of time resources and within the first set of frequency resources; and it transmits a RACH preamble in the time-frequency resource according to the four-step random access procedure in response to determining that a time-frequency resource within the second set of time resources and the second set of frequency resources to be used for transmitting a RACH preamble according to the two-step random access procedure is within the first set of time resources and within the first set of frequency resources.

In an embodiment, the second time resource indication and the second frequency resource indication further indicate an association period, and the association period may be configured by the radio access node 1520 taking the following parameters for the second random access procedure into account: a preamble format, a RACH configuration period, an association period configuration, and an association pattern period configuration. For example, only one set of the ROs in some association period for mapping SSBs to RACH occasions for four-step random access procedure are used for two-step random access procedure.

In an embodiment, the second time resource indication and the second frequency resource indication are transmitted via an RRC message.

The subset may be a fixed subset of the RO from the four-step random access procedure, or indicated via a RRC signaling. In an embodiment, the radio access node 1520 may configure the subset of time resources or frequency resources by taking the following parameters for the second random access procedure into account: a number of RACH occasions mapped by a whole set of SSBs in one SSB burst set; a number of SSBs actually transmitted; a RACH configuration index, and whether the spectrum type is paired spectrum or unpaired spectrum.

In an embodiment, even if the wireless communication device 1540 transmits a RACH preamble according to the two-step random access procedure, the radio access node 1520 may correctly decode the RACH preamble and know that the RACH preamble is transmitted according to the two-step random access procedure, but receive no PUSCH data or cannot decode the PUSCH data, it transmits a Random Access Response (RAR) to the wireless communication device 1540 by following the two-step random access procedure. Accordingly, the wireless communication device 1540 receives a Random Access Response (RAR) from the radio access node 1520 after a RACH preamble and PUSCH data are transmitted according to the second random access procedure or only a RACH preamble is transmitted according to the second access procedure, wherein the the radio access node 1520 determines that the RACH preamble is associated with the second random access procedure but no PUSCH data being received or correctly decoded. That is, the wireless communication device 1540 fails to access the network by taking the two-step random access procedure, and then follows the four-step random access procedure to access the network device.

In some embodiments, wireless communication device 1540 is configured to use both the first and second set of ROs, select one of the first and second set of ROs in which to transmit the RACH preamble, and then follow the RACH procedure associated with the RO in which it transmits the RACH preamble. The wireless communication device 1540 determines whether an upcoming time resource is in the first set of time resource or the second set of time resource, and transmits a RACH preamble according to the first random access procedure if the upcoming time resource is in the first set of time resource and according to the second random access procedure if the upcoming time resource is in the second set of time resource. The wireless communication device 1540 may use a criterion to select the RO, where the criterion can be to transmit the RACH preamble in the next available RO after the time it determines that a RACH transmission is needed.

The two-step and four-step random access procedures in a cell may be used by different numbers of wireless communication devices, and so it may be desirable to control the load on resources used by two-step and four-step random access procedures. One way to do this is to constrain wireless communication devices capable of two-step random access procedure to use two-step random access procedure in a first attempt of a random access procedure, and to then allow the wireless communication device to use both two-step and four-step resources in a second attempt using the four-step random access procedure if the first attempt is not successful. In such cases, the criteria for RO selection can be to select a RO in the second set of ROs for a first random access attempt, to determine that a second random access attempt is needed, and then to select a RO from either the first or second set of ROs for a second random access attempt.

In some embodiments, the two-step ROs are separately configured (e.g., by the radio access node), and the second time resource indication and the second frequency resource indication are configured by the radio access node 1520 taking at least one of the following parameters into accounts: a periodicity for the second random access procedure relative to the periodicity for the first random access procedure; a possible collision between the second random access procedure and the first random access procedure; and a possible collision between the second random access procedure with other signals than a RACH preamble.

For example, a periodicity for two-step random access procedure larger than that used for four-step random access procedure can be configured when only a small number of wireless communication devices are expected to use two-step random access procedure, while a periodicity smaller than that used for four-step random access procedure can be configured when a large number of wireless communication devices are expected to use two-step random access procedure.

Figure 16:
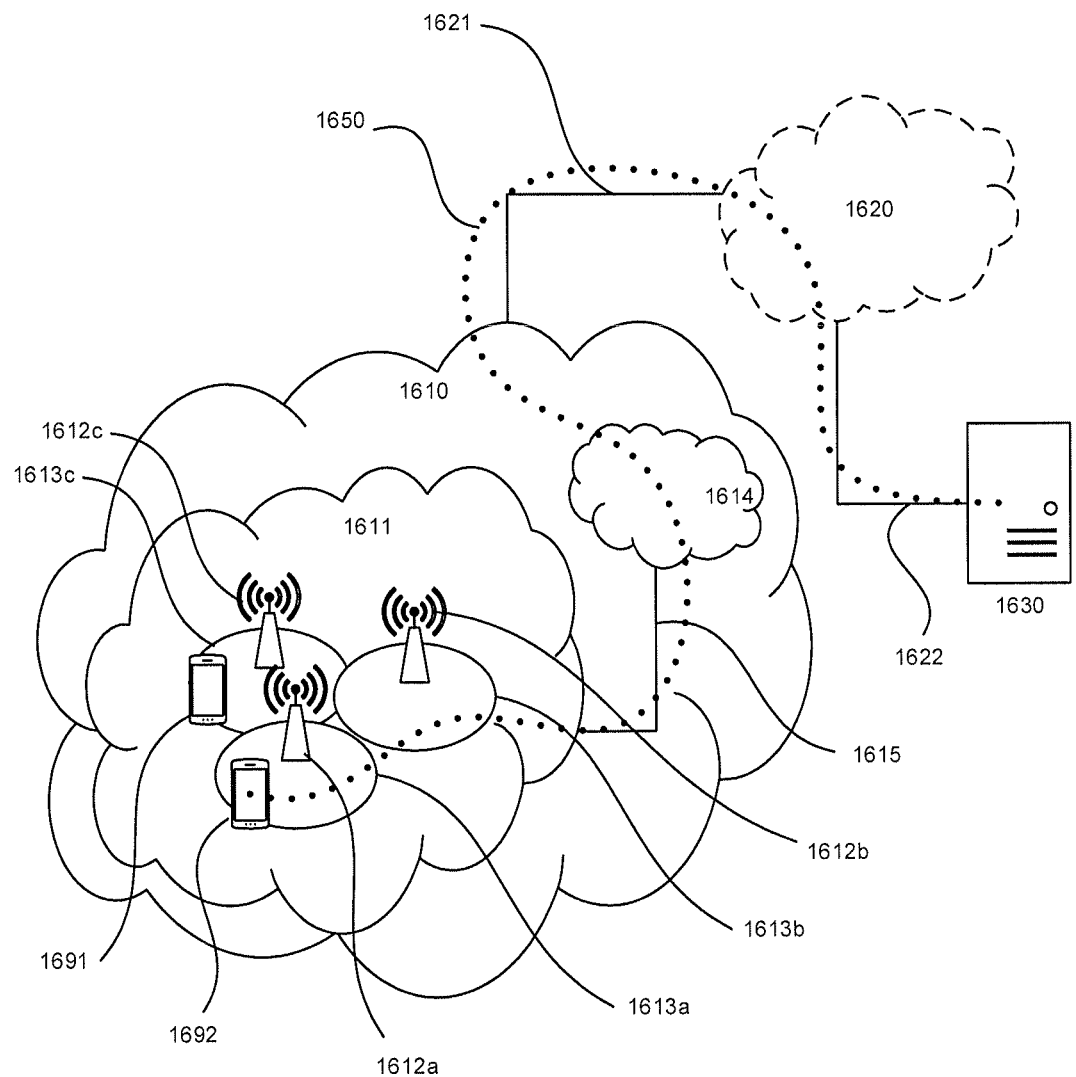
FIG. 16 schematically illustrates a telecommunication network connected via an intermediate network to a host computer.

With reference to FIG. 16, in accordance with an embodiment, a communication system includes a telecommunication network 1610, such as a 3GPP-type cellular network, which comprises an access network 1611, such as a radio access network, and a core network 1614. The access network 1611 comprises a plurality of base stations 1612a, 1612b, 1612c, such as NBs, eNBs, gNBs or other types of wireless access points, each defining a corresponding coverage area 1613a, 1613b, 1613c. Each base station 1612a, 1612b, 1612c is connectable to the core network 1614 over a wired or wireless connection 1615. A first UE 1691 located in a coverage area 1613c is configured to wirelessly connect to, or be paged by, the corresponding base station 1612c. A second UE 1692 in a coverage area 1613a is wirelessly connectable to the corresponding base station 1612a. While a plurality of UEs 1691, 1692 are illustrated in this example, the disclosed embodiments are equally applicable to a situation where a sole UE is in the coverage area or where a sole UE is connecting to the corresponding base station 1612.

The telecommunication network 1610 is itself connected to a host computer 1630, which may be embodied in the hardware and/or software of a standalone server, a cloud-implemented server, a distributed server or as processing resources in a server farm. The host computer 1630 may be under the ownership or control of a service provider, or may be operated by the service provider or on behalf of the service provider. Connections 1621 and 1622 between the telecommunication network 1610 and the host computer 1630 may extend directly from the core network 1614 to the host computer 1630 or may go via an optional intermediate network 1620. An intermediate network 1620 may be one of, or a combination of more than one of, a public, private or hosted network; the intermediate network 1620, if any, may be a backbone network or the Internet; in particular, the intermediate network 1620 may comprise two or more sub-networks (not shown).

The communication system of FIG. 16 as a whole enables connectivity between the connected UEs 1691, 1692 and the host computer 1630. The connectivity may be described as an over-the-top (OTT) connection 1650. The host computer 1630 and the connected UEs 1691, 1692 are configured to communicate data and/or signaling via the OTT connection 1650, using the access network 1611, the core network 1614, any intermediate network 1620 and possible further infrastructure (not shown) as intermediaries. The OTT connection 1650 may be transparent in the sense that the participating communication devices through which the OTT connection 1650 passes are unaware of routing of uplink and downlink communications. For example, the base station 1612 may not or need not be informed about the past routing of an incoming downlink communication with data originating from the host computer 1630 to be forwarded (e.g., handed over) to a connected UE 1691. Similarly, the base station 1612 need not be aware of the future routing of an outgoing uplink communication originating from the UE 1691 towards the host computer 1630.

Example implementations, in accordance with an embodiment, of the UE, base station and host computer discussed in the preceding paragraphs will now be described with reference to FIG. 17. In a communication system 1700, a host computer 1710 comprises hardware 1715 including a communication interface 1716 configured to set up and maintain a wired or wireless connection with an interface of a different communication device of the communication system 1700. The host computer 1710 further comprises a processing circuitry 1718, which may have storage and/or processing capabilities. In particular, the processing circuitry 1718 may comprise one or more programmable processors, application-specific integrated circuits, field programmable gate arrays or combinations of these (not shown) adapted to execute instructions. The host computer 1710 further comprises software 1711, which is stored in or accessible by the host computer 1710 and executable by the processing circuitry 1718. The software 1711 includes a host application 1712. The host application 1712 may be operable to provide a service to a remote user, such as UE 1730 connecting via an OTT connection 1750 terminating at the UE 1730 and the host computer 1710. In providing the service to the remote user, the host application 1712 may provide user data which is transmitted using the OTT connection 1750.

The communication system 1700 further includes a base station 1720 provided in a telecommunication system and comprising hardware 1725 enabling it to communicate with the host computer 1710 and with the UE 1730. The hardware 1725 may include a communication interface 1726 for setting up and maintaining a wired or wireless connection with an interface of a different communication device of the communication system 1700, as well as a radio interface 1727 for setting up and maintaining at least a wireless connection 1770 with the UE 1730 located in a coverage area (not shown in FIG. 17) served by the base station 1720. The communication interface 1726 may be configured to facilitate a connection 1760 to the host computer 1710. The connection 1760 may be direct or it may pass through a core network (not shown in FIG. 17) of the telecommunication system and/or through one or more intermediate networks outside the telecommunication system. In the embodiment shown, the hardware 1725 of the base station 1720 further includes a processing circuitry 1728, which may comprise one or more programmable processors, application-specific integrated circuits, field programmable gate arrays or combinations of these (not shown) adapted to execute instructions. The base station 1720 further has software 1721 stored internally or accessible via an external connection.

The communication system 1700 further includes the UE 1730 already referred to. Its hardware 1735 may include a radio interface 1737 configured to set up and maintain a wireless connection 1770 with a base station serving a coverage area in which the UE 1730 is currently located. The hardware 1735 of the UE 1730 further includes a processing circuitry 1738, which may comprise one or more programmable processors, application-specific integrated circuits, field programmable gate arrays or combinations of these (not shown) adapted to execute instructions. The UE 1730 further comprises software 1731, which is stored in or accessible by the UE 1730 and executable by the processing circuitry 1738. The software 1731 includes a client application 1732. The client application 1732 may be operable to provide a service to a human or non-human user via the UE 1730, with the support of the host computer 1710. In the host computer 1710, an executing host application 1712 may communicate with the executing client application 1732 via the OTT connection 1750 terminating at the UE 1730 and the host computer 1710. In providing the service to the user, the client application 1732 may receive request data from the host application 1712 and provide user data in response to the request data. The OTT connection 1750 may transfer both the request data and the user data. The client application 1732 may interact with the user to generate the user data that it provides.

Figure 17:
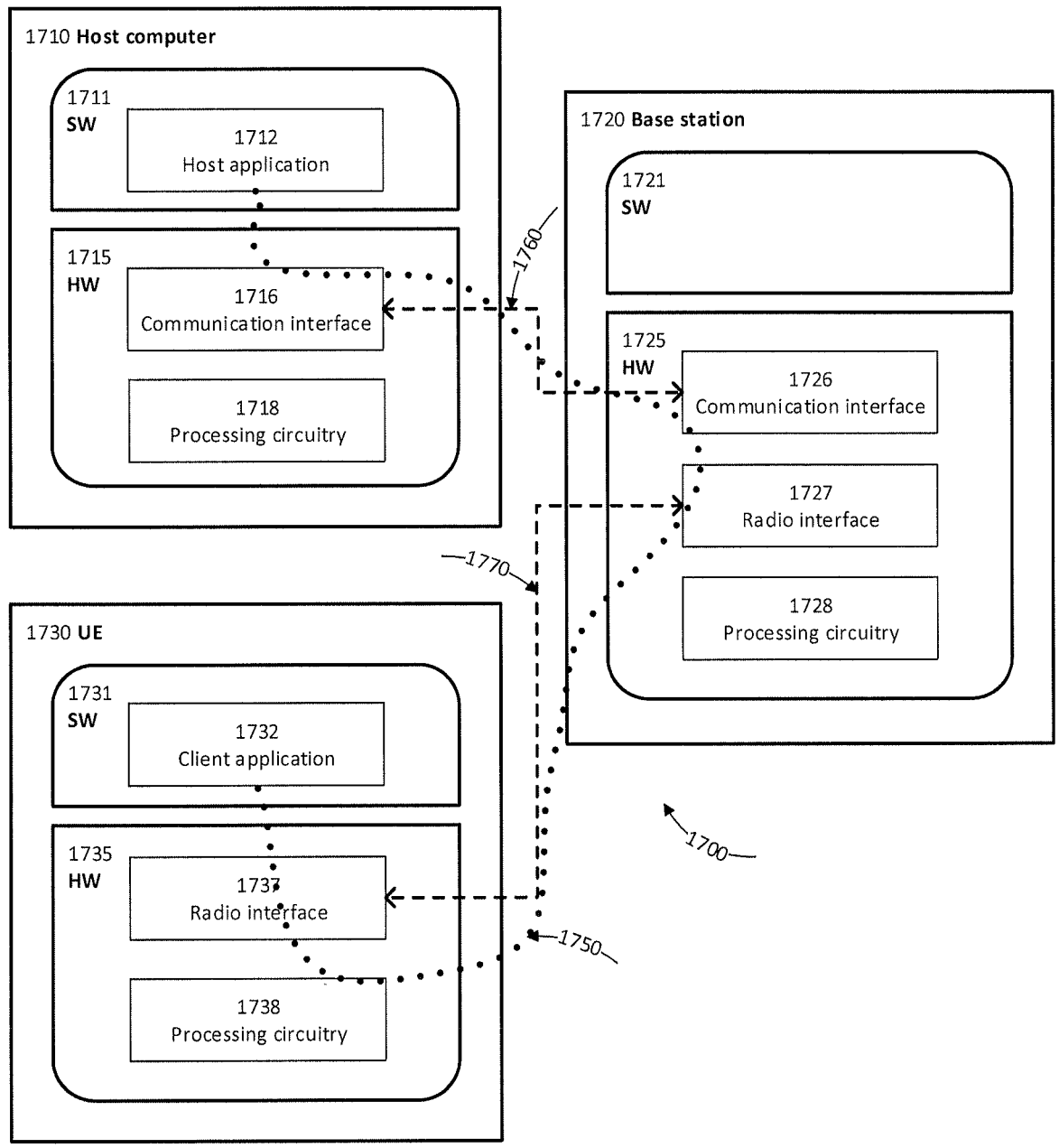
FIG. 17 is a generalized block diagram of a host computer communicating via a base station with a user equipment over a partially wireless connection.

It is noted that the host computer 1710, the base station 1720 and the UE 1730 illustrated in FIG. 17 may be similar or identical to the host computer 1630, one of base stations 1612a, 1612b, 1612c and one of UEs 1691, 1692 of FIG. 16, respectively. This is to say, the inner workings of these entities may be as shown in FIG. 17 and independently, the surrounding network topology may be that of FIG. 16.

In FIG. 17, the OTT connection 1750 has been drawn abstractly to illustrate the communication between the host computer 1710 and the UE 1730 via the base station 1720, without explicit reference to any intermediary devices and the precise routing of messages via these devices. Network infrastructure may determine the routing, which it may be configured to hide from the UE 1730 or from the service provider operating the host computer 1710, or both. While the OTT connection 1750 is active, the network infrastructure may further take decisions by which it dynamically changes the routing (e.g., on the basis of load balancing consideration or reconfiguration of the network).

Wireless connection 1770 between the UE 1730 and the base station 1720 is in accordance with the teachings of the embodiments described throughout this disclosure. One or more of the various embodiments improve the performance of OTT services provided to the UE 1730 using the OTT connection 1750, in which the wireless connection 1770 forms the last segment. More precisely, the teachings of these embodiments may improve the radio resource utilization and thereby provide benefits such as reduced user waiting time.

A measurement procedure may be provided for the purpose of monitoring data rate, latency and other factors on which the one or more embodiments improve. There may further be an optional network functionality for reconfiguring the OTT connection 1750 between the host computer 1710 and the UE 1730, in response to variations in the measurement results. The measurement procedure and/or the network functionality for reconfiguring the OTT connection 1750 may be implemented in software 1711 and hardware 1715 of the host computer 1710 or in software 1731 and hardware 1735 of the UE 1730, or both. In embodiments, sensors (not shown) may be deployed in or in association with communication devices through which the OTT connection 1750 passes; the sensors may participate in the measurement procedure by supplying values of the monitored quantities exemplified above, or supplying values of other physical quantities from which the software 1711, 1731 may compute or estimate the monitored quantities. The reconfiguring of the OTT connection 1750 may include message format, retransmission settings, preferred routing etc.; the reconfiguring need not affect the base station 1720, and it may be unknown or imperceptible to the base station 1720. Such procedures and functionalities may be known and practiced in the art. In certain embodiments, measurements may involve proprietary UE signaling facilitating the host computer 1710's measurements of throughput, propagation times, latency and the like. The measurements may be implemented in that the software 1711 and 1731 causes messages to be transmitted, in particular empty or 'dummy' messages, using the OTT connection 1750 while it monitors propagation times, errors etc.

FIG. 18 is a flowchart illustrating a method implemented in a communication system, in accordance with an embodiment. The communication system includes a host computer, a base station and a UE which may be those described with reference to FIG. 16 and FIG. 17. For simplicity of the present disclosure, only drawing references to FIG. 18 will be included in this section. In step 1810, the host computer provides user data. In substep 1811 (which may be optional) of step 1810, the host computer provides the user data by executing a host application. In step 1820, the host computer initiates a transmission carrying the user data to the UE. In step 1830 (which may be optional), the base station transmits to the UE the user data which was carried in the transmission that the host computer initiated, in accordance with the teachings of the embodiments described throughout this disclosure. In step 1840 (which may also be optional), the UE executes a client application associated with the host application executed by the host computer.

FIG. 19 is a flowchart illustrating a method implemented in a communication system, in accordance with an embodiment. The communication system includes a host computer, a base station and a UE which may be those described with reference to FIG. 16 and FIG. 17. For simplicity of the present disclosure, only drawing references to FIG. 19 will be included in this section. In step 1910 of the method, the host computer provides user data. In an optional substep (not shown) the host computer provides the user data by executing a host application. In step 1920, the host computer initiates a transmission carrying the user data to the UE. The transmission may pass via the base station, in accordance with the teachings of the embodiments described throughout this disclosure. In step 1930 (which may be optional), the UE receives the user data carried in the transmission.

Figure 20:
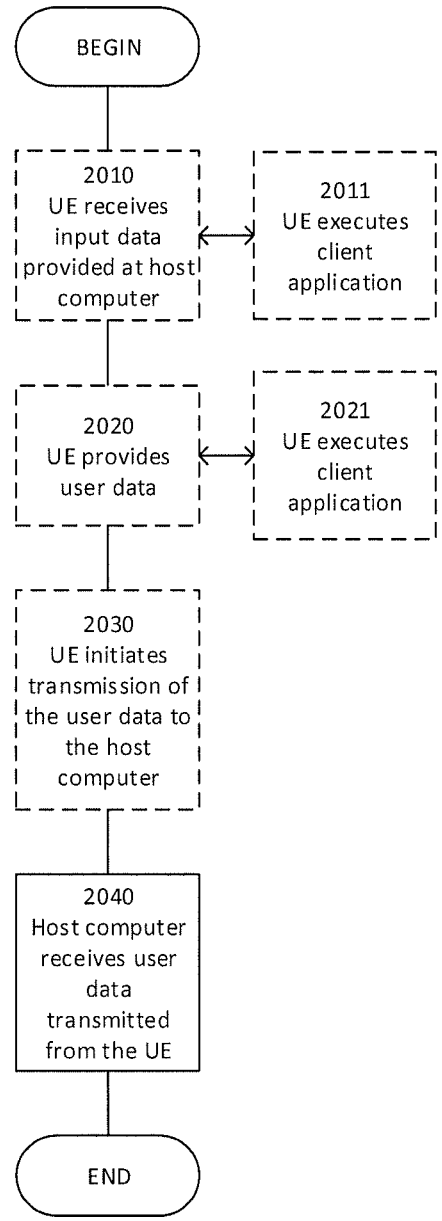

FIG. 20 is a flowchart illustrating a method implemented in a communication system, in accordance with an embodiment. The communication system includes a host computer, a base station and a UE which may be those described with reference to FIG. 16 and FIG. 17. For simplicity of the present disclosure, only drawing references to FIG. 20 will be included in this section. In step 2010 (which may be optional), the UE receives input data provided by the host computer. Additionally or alternatively, in step 2020, the UE provides user data. In substep 2021 (which may be optional) of step 2020, the UE provides the user data by executing a client application. In substep 2011 (which may be optional) of step 2010, the UE executes a client application which provides the user data in reaction to the received input data provided by the host computer. In providing the user data, the executed client application may further consider user input received from the user. Regardless of the specific manner in which the user data was provided, the UE initiates, in substep 2030 (which may be optional), transmission of the user data to the host computer. In step 2040 of the method, the host computer receives the user data transmitted from the UE, in accordance with the teachings of the embodiments described throughout this disclosure.

Figure 21:
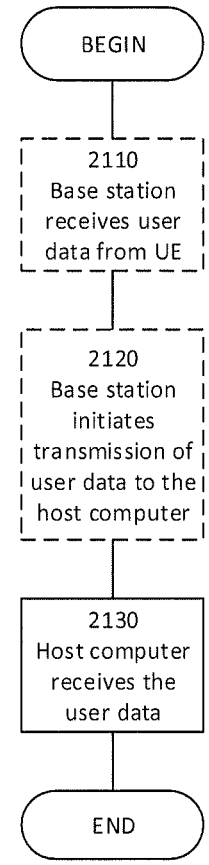

FIG. 21 is a flowchart illustrating a method implemented in a communication system, in accordance with an embodiment. The communication system includes a host computer, a base station and a UE which may be those described with reference to FIG. 16 and FIG. 17. For simplicity of the present disclosure, only drawing references to FIG. 21 will be included in this section. In step 2110 (which may be optional), in accordance with the teachings of the embodiments described throughout this disclosure, the base station receives user data from the UE. In step 2120 (which may be optional), the base station initiates transmission of the received user data to the host computer. In step 2130 (which may be optional), the host computer receives the user data carried in the transmission initiated by the base station.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method in a terminal device, comprising:
receiving a Random Access Channel (RACH) Occasion configuration from a network device, the RACH Occasion configuration comprises a first time resource indication identifying at least a first set of time resources in which the terminal device is allowed to transmit a RACH preamble according to a first random access procedure, a first frequency resource indication identifying at least a first set of frequency resources associated with the first set of time resources, in which the terminal device is allowed to transmit the RACH preamble according to the first random access procedure, wherein the first random access procedure is a four-step random access procedure, a second time resource indication identifying at least a second set of time resources in which the terminal device is allowed to transmit a RACH preamble according to a second random access procedure, and a second frequency resource indication identifying at least a second set of frequency resources associated with the second set of time resources, in which the terminal device is allowed to transmit the RACH preamble according to the second random access procedure, wherein the second random access procedure is a two-step random access procedure and wherein RACH occasions are frequency division multiplexed in at least one time instance;
selecting the first set of time resources and the first set of frequency resources, or selecting the second set of time resources and the second set of frequency resources, based on which of the four-step random access procedure or the two-step random access procedure is being utilized by the terminal device to transmit a RACH preamble; and
transmitting the RACH preamble according to the RACH Occasion configuration separately from Physical Uplink Shared Channel (PUSCH) for the four-step random access procedure by utilizing resources from the first set of time resources and the first set of frequency resources or transmitting the RACH preamble and the PUSCH according to the RACH Occasion configuration in a same message during a first step of the two-step random access procedure by utilizing resources from the second set of time resources and the second set of frequency resources.

2. The method of claim 1, wherein the second set of time resources are at least partly different from the first set of time resources in time domain, or the second set of frequency resources are at least partly different from the first set of frequency resources in frequency domain, or the second set of time resources are at least partly different from the first set of time resources in time domain and the second set of frequency resources are at least partly different from the first set of frequency resources in frequency domain.

3. The method of claim 2, wherein the first and second time resource indications are configured so that the second time resource indication identifies a part in a RACH configuration table, and the first time resource indication identifies a different part in the RACH configuration table.

4. The method of claim 3, wherein the part comprises rows, or columns, or both rows and columns in the RACH configuration table.

5. The method of claim 4, wherein an existing RACH configuration table configured for the first random access procedure is reused or modified as the RACH configuration table.

6. The method of claim 1, wherein the second frequency resource indication comprises a parameter defining a number of RACH occasions that are frequency division multiplexed in at least one time resource.

7. The method of claim 1, wherein the second time resource indication and the second frequency resource indication indicate that the second set of time resources is a subset of the first set of time resources in time domain and the second set of frequency resources is a subset of the first set of frequency resources in frequency domain.

8. The method of claim 7, further comprises:
in response to determining a time-frequency resource within the second set of time resources and the second set of frequency resources to be used for transmitting a RACH preamble according to the second random access procedure is within the first set of time resources and within the first set of frequency resources, transmitting a RACH preamble in the time-frequency resource according to the first random access procedure.

9. The method of claim 7, wherein the second time resource indication and the second frequency resource indication further indicate an association period.

10. The method of claim 7, wherein the subset of time resources or frequency resources is configured by taking the following parameters for the second random access procedure into account:
- a number of RACH occasions mapped by a whole set of Synchronization Signal (SS)/Physical Broadcast Channel (PBCH) blocks (SSBs) in one SSB burst set;
- a number of SSBs actually transmitted;
- a RACH configuration index; and
- whether a spectrum type is paired spectrum or unpaired spectrum.

11. The method of claim 1, further comprises:
- receiving, from the network device, a Random Access Response (RAR) including an indication that identifies resources in which the terminal device is allowed to transmit PUSCH data, wherein the network device determines that the RACH preamble is associated with the first random access procedure; and
- transmitting the PUSCH data in the identified resources.

12. The method of claim 1, further comprising:
- determining whether an upcoming time resource is in the first set of time resource or the second set of time resource; and
- transmitting a RACH preamble according to the first random access procedure if the upcoming time resource is in the first set of time resource and according to the second random access procedure if the upcoming time resource is in the second set of time resource.

13. The method of claim 1, further comprises:
- receiving a Random Access Response (RAR) from the network device after a RACH preamble and PUSCH data are transmitted according to the second random access procedure or only a RACH preamble is transmitted according to the second access procedure, wherein the network device determines that the RACH preamble is associated with the second random access procedure but no PUSCH data being received or correctly decoded.

14. The method of claim 1, wherein in the two-step random access procedure, the terminal device transmits message A that includes the RACH preamble and the PUSCH.

15. A terminal device comprising:
- a processor; and
- a memory comprising instructions which, when executed by the processor cause the terminal device to perform operations to:
- receive a Random Access Channel (RACH) Occasion configuration from a network device, the RACH Occasion configuration comprises a first time resource indication identifying at least a first set of time resources in which the terminal device is allowed to transmit a RACH preamble according to a first random access procedure, a first frequency resource indication identifying at least a first set of frequency resources associated with the first set of time resources, in which the terminal device is allowed to transmit the RACH preamble according to the first random access procedure, wherein the first random access procedure is a four-step random access procedure, a second time resource indication identifying at least a second set of time resources in which the terminal device is allowed to transmit a RACH preamble according to a second random access procedure, and a second frequency resource indication identifying at least a second set of frequency resources associated with the second set of time resources, in which the terminal device is allowed to transmit the RACH preamble according to the second random access procedure, wherein the second random access procedure is a two-step random access procedure and wherein RACH occasions are frequency division multiplexed in at least one time instance; and
- select the first set of time resources and the first set of frequency resources, or select the second set of time resources and the second set of frequency resources, based on which of the four-step random access procedure or the two-step random access procedure is to be utilized by the terminal device to transmit a RACH preamble; and
- transmit the RACH preamble according to the RACH Occasion configuration separately from Physical Uplink Shared Channel (PUSCH) for the four-step random access procedure by utilizing resources from the first set of time resources and the first set of frequency resources or transmit the RACH preamble and the PUSCH according to the RACH Occasion configuration in a same message for during a first step of the two-step random access procedure by utilizing resources from the second set of time resources and the second set of frequency resources.

16. The terminal device of claim 15, wherein the second set of time resources are at least partly different from the first set of time resources in time domain, or the second set of frequency resources are at least partly different from the first set of frequency resources in frequency domain, or the second set of time resources are at least partly different from the first set of time resources in time domain and the second set of frequency resources are at least partly different from the first set of frequency resources in frequency domain.

17. The terminal device of claim 16, wherein the first and second time resource indications are configured so that the second time resource indication identifies a part in a RACH configuration table, and the first time resource indication identifies a different part in the RACH configuration table.

18. The terminal device of claim 17, wherein the part comprises rows, or columns, or both rows and columns in the RACH configuration table.

19. The terminal device of claim 18, wherein an existing RACH configuration table configured for the first random access procedure is reused or modified as the RACH configuration table.

20. The terminal device of claim 15, wherein the second frequency resource indication comprises a parameter defining a number of RACH occasions that are frequency division multiplexed in at least one time resource.

21. The terminal device of claim 15, wherein the second time resource indication and the second frequency resource indication indicate that the second set of time resources is a subset of the first set of time resources in time domain and the second set of frequency resources is a subset of the first set of frequency resources in frequency domain.

22. The terminal device of claim 21, further comprises:
- in response to determining a time-frequency resource within the second set of time resources and the second set of frequency resources to be used for transmitting a RACH preamble according to the second random access procedure is within the first set of time resources and within the first set of frequency resources, transmit a RACH preamble in the time-frequency resource according to the first random access procedure.

23. The terminal device of claim 21, wherein the second time resource indication and the second frequency resource indication further indicate an association period.

24. The terminal device of claim 21, wherein the subset of time resources or frequency resources is configured by taking the following parameters for the second random access procedure into account:
- a number of RACH occasions mapped by a whole set of Synchronization Signal (SS)/Physical Broadcast Channel (PBCH) blocks (SSBs) in one SSB burst set;
- a number of SSBs actually transmitted;
- a RACH configuration index; and
- whether a spectrum type is paired spectrum or unpaired spectrum.

25. The terminal device of claim 15, wherein the operations further comprise:
- receive, from the network device, a Random Access Response (RAR) including an indication that identifies resources in which the terminal device is allowed to transmit PUSCH data, wherein the network device determines that the RACH preamble is associated with the first random access procedure; and
- transmit the PUSCH data in the identified resources.

26. The terminal device of claim 15, wherein the operations further comprise:
- determine whether an upcoming time resource is in the first set of time resource or the second set of time resource; and
- transmit a RACH preamble according to the first random access procedure if the upcoming time resource is in the first set of time resource and according to the second random access procedure if the upcoming time resource is in the second set of time resource.

27. The terminal device of claim 15, wherein the operations further comprise:
- receive a Random Access Response (RAR) from the network device after a RACH preamble and PUSCH data are transmitted according to the second random access procedure or only a RACH preamble is transmitted according to the second access procedure, wherein the network device determines that the RACH preamble is associated with the second random access procedure but no PUSCH data being received or correctly decoded.

28. The terminal device of claim 15, wherein in the two-step random access procedure, the terminal device transmits message A that includes the RACH preamble and the PUSCH.

29. A non-transitory computer readable storage medium having computer program instructions stored thereon, the computer program instructions, when executed by a processor in a terminal device, are capable of causing the terminal device to perform operations comprising:
- receiving a Random Access Channel (RACH) Occasion configuration from a network device, the RACH Occasion configuration comprises a first time resource indication identifying at least a first set of time resources in which the terminal device is allowed to transmit a RACH preamble according to a first random access procedure, a first frequency resource indication identifying at least a first set of frequency resources associated with the first set of time resources, in which the terminal device is allowed to transmit the RACH preamble according to the first random access procedure, wherein the first random access procedure is a four-step random access procedure, a second time resource indication identifying at least a second set of time resources in which the terminal device is allowed to transmit a RACH preamble according to a second random access procedure, and a second frequency resource indication identifying at least a second set of frequency resources associated with the second set of time resources, in which the terminal device is allowed to transmit the RACH preamble according to the second random access procedure, wherein the second random access procedure is a two-step random access procedure and wherein RACH occasions are frequency division multiplexed in at least one time instance; and
- selecting the first set of time resources and the first set of frequency resources, or selecting the second set of time resources and the second set of frequency resources, based on which of the four-step random access procedure or the two-step random access procedure is being utilized by the terminal device to transmit a RACH preamble; and
- transmitting the RACH preamble according to the RACH Occasion configuration separately from Physical Uplink Shared Channel (PUSCH) for the four-step random access procedure by utilizing resources from the first set of time resources and the first set of frequency resources or transmitting the RACH preamble and the PUSCH according to the RACH Occasion configuration in a same message during a first step of the two-step random access procedure by utilizing resources from the second set of time resources and the second set of frequency resources.

* * * * *

UNITED STATES PATENT AND TRADEMARK OFFICE
CERTIFICATE OF CORRECTION

PATENT NO. : 11,700,648 B2
APPLICATION NO. : 15/733021
DATED : July 11, 2023
INVENTOR(S) : Lin et al.

It is certified that error appears in the above-identified patent and that said Letters Patent is hereby corrected as shown below:

In the Drawings

In Fig. 10, Sheet 6 of 13, and on the title page, the illustrative print figure, for Tag "S1010", Line 2, delete "from" and insert -- form --, therefor.

In the Specification

In Column 11, Line 32, delete "16" and insert -- 1 --, therefor.

In Column 12, Line 50, delete "n10," and insert -- n50, --, therefor.

In Column 12, Line 53, delete "{sl1, sl2, al4, al8, sl10, sl20, sl40, sl80}," and insert -- {s11, s12, s14, s18, s110, s120, s140, s180}, --, therefor.

In Column 31, Line 26, delete "terminal devises," and insert -- terminal devices, --, therefor.

In the Claims

In Column 48, Line 5, in Claim 15, delete "instance; and" and insert -- instance; --, therefor.

In Column 48, Line 21, in Claim 15, delete "message for" and insert -- message --, therefor.

In Column 50, Line 28, in Claim 29, delete "instance; and" and insert -- instance; --, therefor.

Signed and Sealed this
Twenty-eighth Day of November, 2023

Katherine Kelly Vidal
*Director of the United States Patent and Trademark Office*